United States Patent
Kobayashi et al.

(10) Patent No.: US 11,216,066 B2
(45) Date of Patent: Jan. 4, 2022

(54) DISPLAY DEVICE, LEARNING DEVICE, AND CONTROL METHOD OF DISPLAY DEVICE

(71) Applicant: SEIKO EPSON CORPORATION, Tokyo (JP)

(72) Inventors: Shinichi Kobayashi, Azumino (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/677,827

(22) Filed: Nov. 8, 2019

(65) Prior Publication Data
US 2020/0150758 A1 May 14, 2020

(30) Foreign Application Priority Data
Nov. 9, 2018 (JP) .............................. JP2018-211050

(51) Int. Cl.
*G06F 3/01* (2006.01)
*G02B 27/01* (2006.01)
*G02B 27/00* (2006.01)

(52) U.S. Cl.
CPC ......... *G06F 3/013* (2013.01); *G02B 27/0093* (2013.01); *G02B 27/0172* (2013.01); *G02B 27/0179* (2013.01); *G02B 2027/0178* (2013.01); *G02B 2027/0187* (2013.01)

(58) Field of Classification Search
CPC .... G06F 2203/011; G06F 3/017; G06F 3/013; G06F 3/012; G06F 3/011; G02B 2027/0187; G02B 2027/0178; G02B 2027/014; G02B 27/0179; G02B 27/0172; G02B 27/017; G02B 27/0093
See application file for complete search history.

(56) References Cited

U.S. PATENT DOCUMENTS

| | | | |
|---|---|---|---|
| 8,958,631 B2* | 2/2015 | Kutliroff | G06K 9/00355 382/159 |
| 9,046,685 B2* | 6/2015 | Nakada | G06F 3/04892 |
| 2005/0143138 A1* | 6/2005 | Lee | G06F 3/011 455/566 |
| 2014/0101472 A1* | 4/2014 | Rohrweck | G06F 1/3206 713/323 |

(Continued)

FOREIGN PATENT DOCUMENTS

| | | |
|---|---|---|
| JP | 2008-217716 A | 9/2008 |
| JP | 2017-004457 A | 1/2017 |

*Primary Examiner* — Mihir K Rayan
(74) *Attorney, Agent, or Firm* — JCIPRNET

(57) ABSTRACT

A display device includes a display unit, a detection control unit configured to detect a state of a body of the user, an input detection unit configured to receive an input, an application execution unit configured to execute processing when a condition is satisfied, and a display control unit configured to display information about the processing, where the application execution unit executes the processing when the execution instruction is received, the display device includes a learning unit that includes a data set generation unit configured to generate a data set based on a detection result by the detection control unit and an received input, and the learning unit configured to estimate by an estimation model whether the processing is executable, to update the estimation model according to the data set.

8 Claims, 10 Drawing Sheets

(56) References Cited

U.S. PATENT DOCUMENTS

| | | | |
|---|---|---|---|
| 2015/0135090 A1* | 5/2015 | Park | G06F 3/04883 |
| | | | 715/745 |
| 2016/0091965 A1* | 3/2016 | Wang | G06F 3/0346 |
| | | | 345/156 |
| 2016/0341961 A1* | 11/2016 | Mullins | G06F 3/015 |
| 2016/0364002 A1* | 12/2016 | Gates | G06F 3/017 |
| 2018/0197106 A1* | 7/2018 | Fujitani | G06N 20/00 |

* cited by examiner

DISPLAY DEVICE, LEARNING DEVICE, AND CONTROL METHOD OF DISPLAY DEVICE

The present application is based on, and claims priority from JP Application Serial Number 2018-211050, filed Nov. 9, 2018, the disclosure of which is hereby incorporated by reference herein in its entirety.

BACKGROUND

1. Technical Field

The present disclosure relates to a display device, a learning device, and a control method of the display device.

2. Related Art

Until now, it is conceivable that there is an approach in which input is performed by a user while wearing HMD (Head Mounted Display) (see, for example, JP-A-2008-217716). The HMD described in JP-A-2008-217716 detects an operation on the object image by displaying a three-dimensional object image for operation and detecting a hand finger within a predetermined range of the user's eye-line.

When performing an operation using a hand finger as disclosed in JP-A-2008-217716, a state may occur in which the HMD waits for an input without the user's hand finger input. In this case, there is a problem that the user has to hurry the input by the hand finger, and the advantage of the HMD that the user's hands are not blocked is lost.

SUMMARY

An aspect of solving the above-described problem is a display device, which includes a display unit mounted on a head of a user,
a detection unit configured to detect a state of a body of the user, a processing unit configured to execute processing when a condition is satisfied, and
a display control unit configured to display information about the processing on the display unit when the processing unit executes the processing, wherein
the processing unit executes the processing when an execution instruction is received by the input unit while the information about the processing is displayed, the display device includes a learning unit that includes a data set generation unit configured to generate a learning data set based on a detection result by the detection unit and an input received by the input unit, and the learning unit estimates by an estimation model based on the detection result by the detection unit whether the processing is executable, and updates the estimation model according to the learning data set.

In the above-described display device, the learning unit may be configured, such that it estimates by the estimation model whether the processing is executable, based on the type of the processing and the detection result by the detection unit, and the data set generation unit generates the learning data set based on the detection result by the detection unit, the type of the processing, and the input received by the input unit.

In the above-described display device, the detection unit may be configured, such that it performs detection by a sensor provided at the display unit, the sensor is at least one of an eye sensor configured to detect a state of a pupil or a line-of-sight of the user, a heart rate sensor configured to detect a heart rate of the user, and a perspiration sensor configured to detect perspiration of the user.

In the above-described display device, the detection unit may be configured, such that it performs detection by the sensor provided at the display unit, and the sensor is at least one of a motion sensor configured to detect a motion of the display unit and a sensor configured to detect a motion of a muscle of the user.

In the above-described display device, the display device may be configured, such that it includes an imaging unit provided at the display unit, and an environment identification unit configured to identify an environment based on a captured image by the imaging unit, where the learning unit estimates by the estimation model whether the processing is executable, based on an identification result by the environment identification unit and the detection result by the detection unit, and the data set generation unit generates the learning data set based on the detection result by the detection unit, the identification result by the environment identification unit, and the input received by the input unit.

In the above-described display device, the display control unit, that displays the information on the display unit, stops the display after a predetermined display time, and
the display time is determined according to a result estimated by the learning unit using the estimation model.

In the above-described display device, the processing unit may be configured to, such that it determines whether the processing is executable according to an estimated result using the estimation model, when the input is not received by the input unit while the information about the processing is displayed.

An aspect of solving the above-described problem is a display device, which includes a display unit mounted on a head of a user, a detection unit configured to detect a state of a body of the user, a processing unit configured to execute processing when a condition is satisfied, and a display control unit configured to display information about the processing on the display unit when the processing unit executes the processing, where the processing unit is configured to execute the processing based on a detection result by the detection unit while information about the processing is displayed, and the display device includes a learning unit configured to update an estimation model of whether the processing is executable, based on the combination of detection results by the detection unit.

An aspect of solving the above-described problem is a learning device configured to perform processing for a display device including a display unit mounted on the head of a user and a detection unit configured to detect the state of a body of the user, and the learning device includes an input unit configured to receive an input, a processing unit configured to execute processing when a condition is satisfied, and a display control unit configured to display information about the processing on the display unit when the processing unit executes the processing, where the processing unit executes the processing when an execution instruction is received by the input unit while the information about the processing is displayed, the learning device includes a learning unit that includes a data set generation unit configured to generate a learning data set based on a detection result by the detection unit and an input received by the input unit, and the learning unit estimates by an estimation model based on the detection result by the detection unit whether the processing is executable, and updates the estimation model according to the learning data set.

An aspect of solving the above-described problem is a control method of a display device including a display unit mounted on a head of a user, and the control method includes a displaying step for displaying, on the display unit, information about processing to be executed when a condition is satisfied, an execution step for executing the processing when an input of an execution instruction is received while the information is displayed, estimating by an estimation model, based on a detection result obtained by detecting a state of the user, whether the processing is executable, a data set generation step for generating a learning data set based on the detection result and the input, and a learning step for updating the estimation model according to the learning data set.

DESCRIPTION OF EXEMPLARY EMBODIMENTS

1. Configuration of Display System

Figure 1:
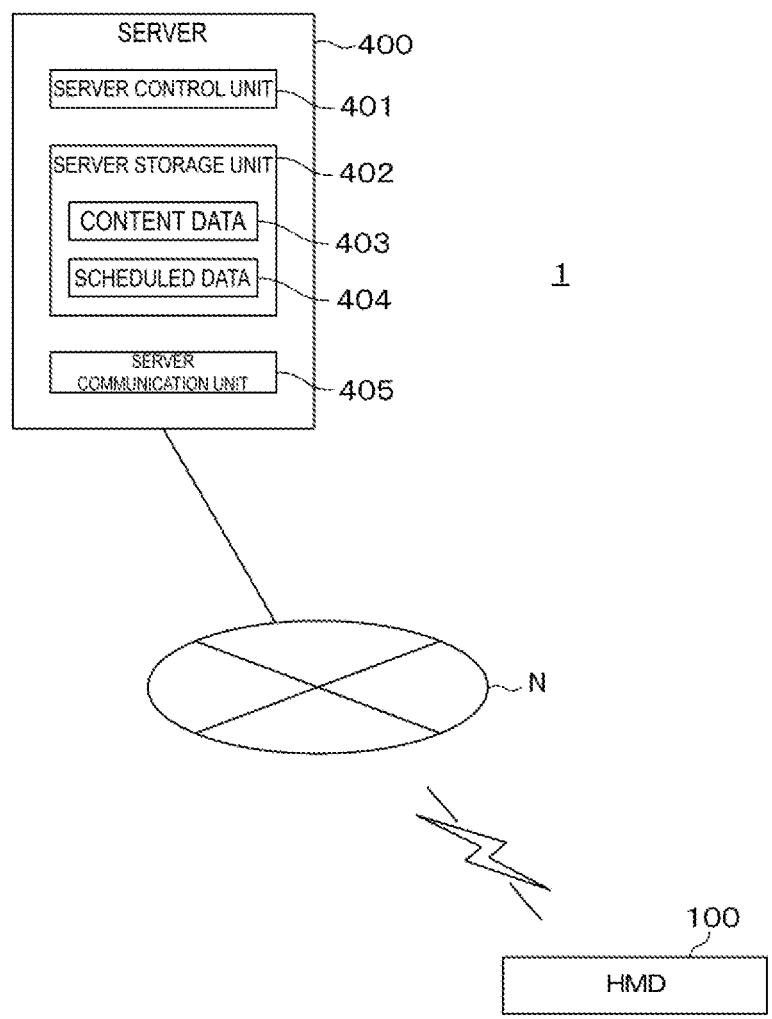
FIG. 1 is a diagram illustrating a configuration of a display system.

FIG. 1 is a schematic configuration diagram of a display system 1 according to an exemplary embodiment to which the disclosure is applied.

The display system 1 includes a head mounted display (HMD) 100 and a server 400, and the HMD 100 and the server 400 are coupled via a communication network N to communicate with each other. HMD 100 corresponds to an example of a display device.

There is no limit to the number of HMDs 100 included in the display system 1, and FIG. 1 illustrates one HMD 100 as one example. When the display system 1 includes a plurality of HMD 100, each HMD 100 can have a common configuration.

As will be described later with reference to FIG. 2, the HMD 100 is a head-mounted display device to be worn by a user U on the head and is a display device of an optically transmissive type which allows the user, while viewing a virtual image, to also view an external scene in a direct manner. The external scene is an outside scene of the user U wearing the HMD 100 and is a real spatial scene visible to the naked eye even when the user U is not wearing an image display unit 20. The user U is a user of HMD 100 and can be an operator.

In the following description, a virtual image viewed by the user via the HMD 100, is referred to as "display image" for convenience. Further, emitting an imaging light based on image data is referred to as "displaying an image". Here, the image is not limited to a static image, but also includes a video image or a video image.

This configuration is an example, and, for example, HMD 100 may be a so-called video see-through type display device in which the HMD 100 is optically opaque and causes the user U to indirectly view the external scene by displaying a captured image of the external scene.

The communication network N is achieved by various types of communication lines such as a wireless communication line (including a public network, a dedicated line, and a mobile phone line) and a backbone communication line of these lines, or by a combination of the various types of communication lines, and a specific configuration is not limited.

The server 400 includes a server control unit 401, a server storage unit 402, and a server communication unit 405. The server storage unit 402 is a storage device that stores data that can be provided to the HMD 100, and stores content data 403 and scheduled data 404 in the example of FIG. 1. The content data 403 is video data with audio, static image data, video image data, or the like, and is in a data format which can be reproduced by HMD 100. The scheduled data 404 is scheduled data associated with HMD 100, including, for example, date and time information and data such as events associated with the user U.

The server communication unit 405 executes data communication with the HMD 100 through the communication network N. The server communication unit 405 transmits data stored in the server storage unit 402 to the HMD 100 according to the control of the server control unit 401. The server control unit 401 causes the server communication unit 405 to transmit the content data 403 and the scheduled data 404 to the HMD 100, for example, in accordance with the request of HMD 100. Thus, the HMD 100 can acquire the content data 403 and the scheduled data 404 from the server 400. The specific mode in which the HMD 100 acquires the content data 403 and the scheduled data 404 is not limited, and the HMD 100 may download the data, or the server communication unit 405 may perform streaming transmission to the HMD 100.

2. Configuration of HMD

Figure 2:
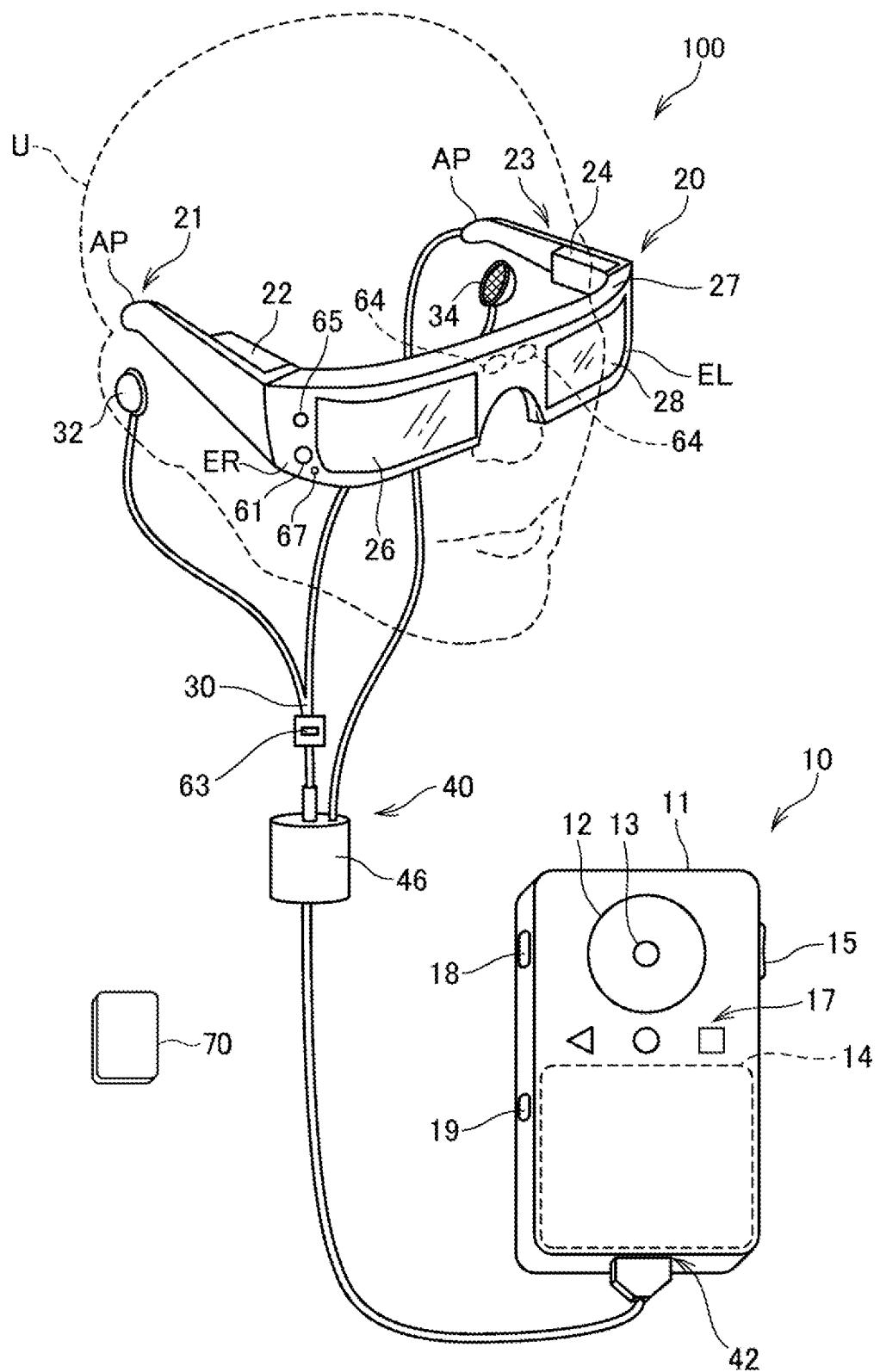
FIG. 2 is a diagram illustrating an appearance configuration of an HMD.

FIG. 2 is a diagram illustrating an appearance configuration of the HMD 100.

The HMD 100 includes an image display unit 20 to be worn on a head of a user U, and a controller 10 configured to control the image display unit 20. The image display unit 20 causes the user to visually view a virtual image in a state of being mounted on the head of the user U. The controller 10 functions as a control device configured to operate the HMD 100 by the user U. The image display unit 20 corresponds to an example of a display unit.

The controller 10 is provided with various switches or the like in the box-shaped main body 11 as an operating element for receiving the operation of the user U. In the exemplary embodiment, the image display unit 20 has an eyeglass shape, and includes, in a main body (including a right holding part 21, a left holding part 23, and a front frame 27), a right display unit 22, a left display unit 24, a right light-guiding plate 26, and a left light-guiding plate 28.

The right holding part 21 and the left holding part 23 extend rearward from corresponding ends of the front frame 27, to hold the image display unit 20 on the head of the user U. One of the ends of the front frame 27, which lies on the right side of the user U when the user U wears the image display unit 20, is referred to as an end ER, while the other one of the ends, which lies on the left side, is referred to as an end EL.

The right light-guiding plate 26 and the left light-guiding plate 28 are provided on the front frame 27. While the image display unit 20 is worn, the right light-guiding plate 26 lies in front of a right eye of the user U, while the left light-guiding plate 28 lies in front of a left eye of the user U.

The right display unit 22 and the left display unit 24 are modules in which an optical unit and a peripheral circuit are unitized, and are configured to emit an imaging light. The right display unit 22 is attached to the right holding part 21 and the left display unit 24 is attached to the left holding part 23.

The right light-guiding plate 26 and the left light-guiding plate 28 are optical components made of a light transmissive resin or the like. The right light-guiding plate 26 and the left light-guiding plate 28 are prisms, for example. The right light-guiding plate 26 guides imaging light output by the right display unit 22 to the right eye of the user U, while the left light-guiding plate 28 guides imaging light output by the left display unit 24 to the left eye of the user. Therefore, the imaging light enters the eyes of the user U, which allows the user U to view an image.

The imaging light guided by the right light-guiding plate 26 and external light transmitted through the right light-guiding plate 26 enter the right eye RE of the user U. Similarly, the imaging light guided by the left light-guiding plate 28 and external light transmitted through the left light-guiding plate 28 enter the left eye LE. As described above, the HMD 100 causes imaging light corresponding to an image processed internally and external light to overlap each other and to enter the eyes of the user U. The user U can see the external scene through the right light-guiding plate 26 and the left light-guiding plate 28, and can view the image by the image light superimposed on the external scene.

A shade having a light control function or an electronic shade capable of electrically adjusting the light transmittance may be provided on the surfaces of the right light-guiding plate 26 and the left light-guiding plate 28.

An illuminance sensor 65 is arranged on the front frame 27 of the image display unit 20. The illuminance sensor 65 is configured to receive external light coming from the front of the user U wearing the image display unit 20.

An outer camera 61 is disposed on the front frame 27 of the image display unit 20. An imaging range and an imaging direction of the outer camera 61 will be described later. The outer camera 61 is provided at a position which does not block the external light passing through the right light-guiding plate 26 and the left light-guiding plate 28. As illustrated in FIG. 2, the outer camera 61 is arranged at the side of the end ER of the front frame 27, however, the camera 61 may be also arranged at the side of the end EL, or at a coupling portion of the right light-guiding plate 26 and the left light-guiding plate 28.

The outer camera 61 is a digital camera including an imaging element such as a CCD and a CMOS, and an imaging lens or the like. In the exemplary embodiment, the outer camera 61 is a monocular camera, but may be configured of a stereo camera. The outer camera 61 is configured to capture an image in accordance with a control by the control unit 150, and to output captured image data to the control unit 150. The outer camera 61 corresponds to an example of the imaging unit.

An LED indicator 67 is disposed on the front frame 27. The LED indicator 67 is disposed adjacent to the outer camera 61 at the end ER and is configured to light up, while the outer camera 61 is operating, to notify that the capturing is in progress.

The distance sensor 64 is configured to detect a distance to an object to be measured located in a preset measurement direction. In the exemplary embodiment, the distance sensor 64 is arranged on the front frame 27 and detects a distance to an object to be measured located in front of the user U. The distance sensor 64 may be a light reflecting type distance sensor including a light source, such as an LED or a laser diode, and a light reception unit configured to receive the reflected light emitted from the light source and reflected by the object to be measured. Further, the distance sensor 64 may be an ultrasonic wave type distance sensor including a sound source configured to generate ultrasonic waves, and a detector configured to receive the ultrasonic waves reflected by the object to be measured. The distance sensor 64 may be a laser range scanner also referred to as a range-scanning sensor. In this case, a range can be measured over a wide area including the front of the image display unit 20.

The controller 10 and the image display unit 20 are coupled via a coupling cable 40. The coupling cable 40 is detachably coupled with a connector 42 of the main body 11.

The coupling cable 40 includes an audio connector 46, and a headset 30 including a right earpiece 32 and a left earpiece 34 included in a stereo headphone, and a microphone 63, is coupled with the audio connector 46.

The microphone 63 is configured to collect audio and output an audio signal to an audio interface 181. The audio interface 181 is described below with reference to FIG. 4. The microphone 63 may be, for example, a monaural microphone or a stereo microphone, or may be a directional microphone or a non-directional microphone.

The controller 10 includes, as parts to be operated by the user U, a wheel operation unit 12, a central key 13, an operation pad 14, an up-down key 15, an LED display unit 17, and a power switch 18. The parts to be operated are arranged on a surface of the main body 11. The parts to be operated are operated with a hand finger of the user U, for example.

The light emitting diode (LED) display unit 17 is arranged in the main body 11. In the main body 11, a transmission portion capable of transmitting light is formed, and an LED of the LED display unit 17 is disposed directly below the transmission portion. Thus, when the LED of the LED display unit 17 emits light, the light transmitted through the transmission portion allows the characters, symbols, patterns, or the like formed in the transmission portion to be visible.

A touch operation on the LED display unit 17 by the hand finger of the user U is detected by a touch sensor 172 described below with reference to FIG. 4. Thus, the combination of the LED display unit 17 and the touch sensor 172 serves as a software key.

The power switch 18 is a switch configured to turn on or off a power supply to the HMD 100. The main body 11 includes a Universal Serial Bus (USB) connector 19 serving as an interface for coupling the controller 10 to an external device.

The HMD 100 includes a sensor unit 70. The sensor unit 70 is mounted on the body of the user U, and includes a sensor for performing detection associated with the body of the user U. The sensor unit 70 may be mounted on the arm of the user U, for example. Also, the sensor unit 70 is mounted anywhere on the body, such as the chest, the head, the leg, the buttocks, the upper arm, the hand, the finger, or the like, of the user U. The sensor unit 70 may be mounted in a manner that is in direct contact with the epidermis of the body of the user U, but may be mounted on the clothes.

The sensor unit 70 may have a wristwatch shape to facilitate mounting, or may have a shape imitating accessories such as a pendant and a ring, and a specific aspect including the shape of the sensor unit may be arbitrary. The sensor unit 70 is also configured as a device other than the HMD 100, referred to as a smart phone or a smart watch. These external devices and the HMD 100 may perform wireless communications to utilize an external device as the sensor unit 70. In the exemplary embodiment, an example is described in which the HMD 100 includes the sensor unit 70 in communication with the controller 10 as a portion of the HMD 100. In addition, as an example, the sensor unit 70 is a wristwatch type device mounted on the arm of the user U, which is held by the band at the upper arm or wrist of the user U, and is configured capable of being close contact with the epidermis of the arm of the user U.

Figure 3:
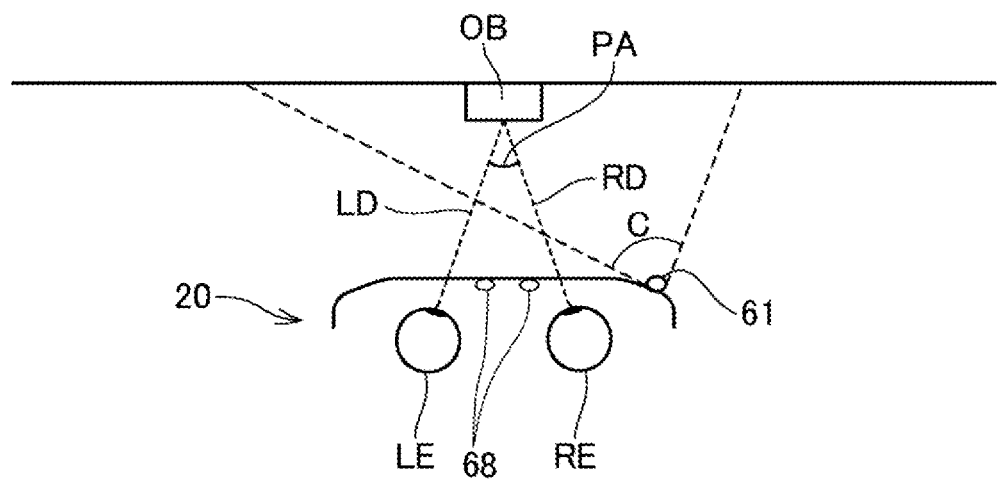
FIG. 3 is a schematic diagram illustrating a correspondence between an image display unit and an imaging range.

FIG. 3 is a diagram illustrating a configuration of a main portion of the image display unit 20 and schematically illustrates a position of the camera 61 in plan view, together with the right eye RE and the left eye LE of the user U.

In FIG. 3, an angle of view, i.e., imaging range, of the outer camera 61 is indicated by C. The outer camera 61 captures an image in the sight line direction of both eyes of the user U, that is, in front of the user U. Note that the actual angle of view of the outer camera 61 also extends in the up-down direction as with any common digital camera.

The outer camera 61 is configured to capture an image of at least a portion of an external scene in a direction of a field of view of the user in a state where the user U wears the HMD 100. Thus, an angle C of view of the outer camera 61 faces a front direction of the user U and overlaps the external scene viewed by the user U through the image display unit 20. The angle C of view may further include the entire field of view viewed by the user U through the image display unit 20.

The outer camera 61 may be configured to focus infinitely, however, the focus of the outer camera 61 may be adjustable in accordance with a control of the control unit 150.

As illustrated in FIG. 3, when the user U gazes an object OB with both eyes, the line-of-sight of the user U is directed to the object OB as illustrated by the symbol RD and LD in the figure. In this case, a distance from the user U to the object OB often ranges from approximately 30 cm to 10 m, and more often ranges from approximately 1 m to 4 m. Thus, standards of an upper limit and a lower limit of the distance from the user U to the object OB in normal use may be defined for the HMD 100. These standards may be determined by research or an experiment, or may be set by the user U. The optical axis and the angle C of view of the outer camera 61 may be set such that when the distance to the object OB in normal use corresponds to the set standard of the upper limit, and when the distance to the object OB in normal use corresponds to the set standard of the lower limit, this object OB may be set so as to be included in the angle of view.

Additionally, in general, a visual field angle of a human is considered approximately 200 degrees in the horizontal direction and approximately 125 degrees in the vertical direction, and an effective field of view excellent in information acceptance performance is considered approximately 30 degrees in the horizontal direction and approximately 20 degrees in the vertical direction. Further, a stable field of fixation in which a point of fixation at which a human gazes is promptly and stably visible is considered to range from approximately 60 degrees to 90 degrees in the horizontal direction, and is considered to range from approximately 45 degrees to 70 degrees in the vertical direction. In this case, when the point of fixation lies at the object OB in FIG. 3, the effective field of view is approximately 30 degrees in the horizontal direction and approximately 20 degrees in the vertical direction around the line-of-sights RD and LD.

Additionally, the stable field of fixation ranges from approximately 60 degrees to 90 degrees in the horizontal direction and from approximately 45 degrees to 70 degrees in the vertical direction, and a visual field angle is approximately 200 degrees in the horizontal direction, and approximately 125 degrees in the vertical direction. Further, a real field of view in which the user U visually recognizes through the image display unit 20, and through the right light-guiding plate 26, and the left light-guiding plate 28 can be referred to as an actual field of view. The actual field of view is also referred to as Field Of View (FOV). The actual field of view corresponds to the real field of view for the user U to view an object through the right light-guiding plate 26 and the left light-guiding plate 28. The actual field of view is narrower than the visual field angle and the stable field of fixation, but wider than the effective field of view.

Here, the angle C of view of the outer camera 61 may be wider than the effective field of view of the user U. More preferably, the angle C of view may be wider than the actual field of view of the user U, and even more preferably the angle C of view may be wider than the stable field of fixation of the user U. Most preferably, the angle C of view may be wider than the visual field angle of both eyes of the user U.

The outer camera 61 may include a so-called wide angle lens as an imaging lens and may be configured to capture an image at a wide angle of view. The wide angle lens may include lenses referred to as an ultrawide lens and a quasi wide lens, or may be a single focus lens or a zoom lens, or the outer camera 61 may be configured to include a lens group including a plurality of lenses.

Further, as described above, the camera 61 may be arranged at the side of the end EL or at the coupling portion between the right light-guiding plate 26 and the left light-guiding plate 28. In this case, a position of the outer camera 61 in the left-right direction is different from the position in FIG. 4 and the optical axis and the angle C of view of the outer camera 61 are appropriately configured in accordance with an installation position of the outer camera 61.

Note that, in the following description, the imaging range of the outer camera 61 corresponding to the angle C of view is simply referred to as an imaging range.

In FIG. 3, a convergence angle of the user U is indicated by a symbol PA. The convergence angle PA corresponds to a distance to the object OB the user U gazes. That is, when the user U sterically views an image and an object, the convergence angle of the right eye RE and the left eye LE is determined in accordance with the distance to the object to be viewed. Therefore, the distance to the object which the user U gazes can be determined by detecting the convergence angle. Further, when an image is displayed so as to guide the convergence angle of the user U, a stereoscopic view can be induced.

By controlling the display position of the images of the right display unit 22 and the left display unit 24, and guiding the line-of-sight RD and LD of the user U, the HMD 100 can control the convergence angle PA when the display image of the image display unit 20 is viewed. Thus, a function of the HMD 100 can adjust a distance for the user U to recognize and perceive the display image of the image display unit 20.

A specific example of an imaging direction in which the outer camera 61 captures an image may include a direction including the line-of-sight direction of the user U, but may include the front of the user U wearing the image display unit 20. Further, the imaging direction of the outer camera 61 may be a movement direction of the user U wearing the image display unit 20. Moreover, the imaging direction may be also a direction in which the user U views a non-display object described later. As mentioned above, the angle of view of the outer camera 61 may be arbitrary and a wide angle. For example, the camera may be capable of capturing an image in 360°, such as an omnidirectional camera, and may be a composite device including a plurality of imaging elements, a plurality of lenses or the like, which can capture a wide angle of view.

FIG. 3 illustrates the inner camera 68 provided by the HMD 100. The inner camera 68 is disposed at a position facing the face of the user U in the image display unit 20, and is disposed facing the right eye RE and the left eye LE. The inner camera 68 captures the right eye RE and the left eye LE. The image captured by the inner camera 68 enables the HMD 100 to identify the direction of the line-of-sight RD of the right eye RE and the direction of the line-of-sight LD of the left eye LE. The HMD 100 may also detect the size of the pupil of the right eye RE and the left eye LE by analyzing the captured image by the inner camera 68. The HMD 100 may specify the miotic or mydriatic state of the user U's pupil based on the change in pupil size. The HMD 100 may also detect the open/closed state of the eyelid of the right eye RE and the left eye LE based on the captured image by the inner camera 68.

3. Control System of the HMD

Figure 4:
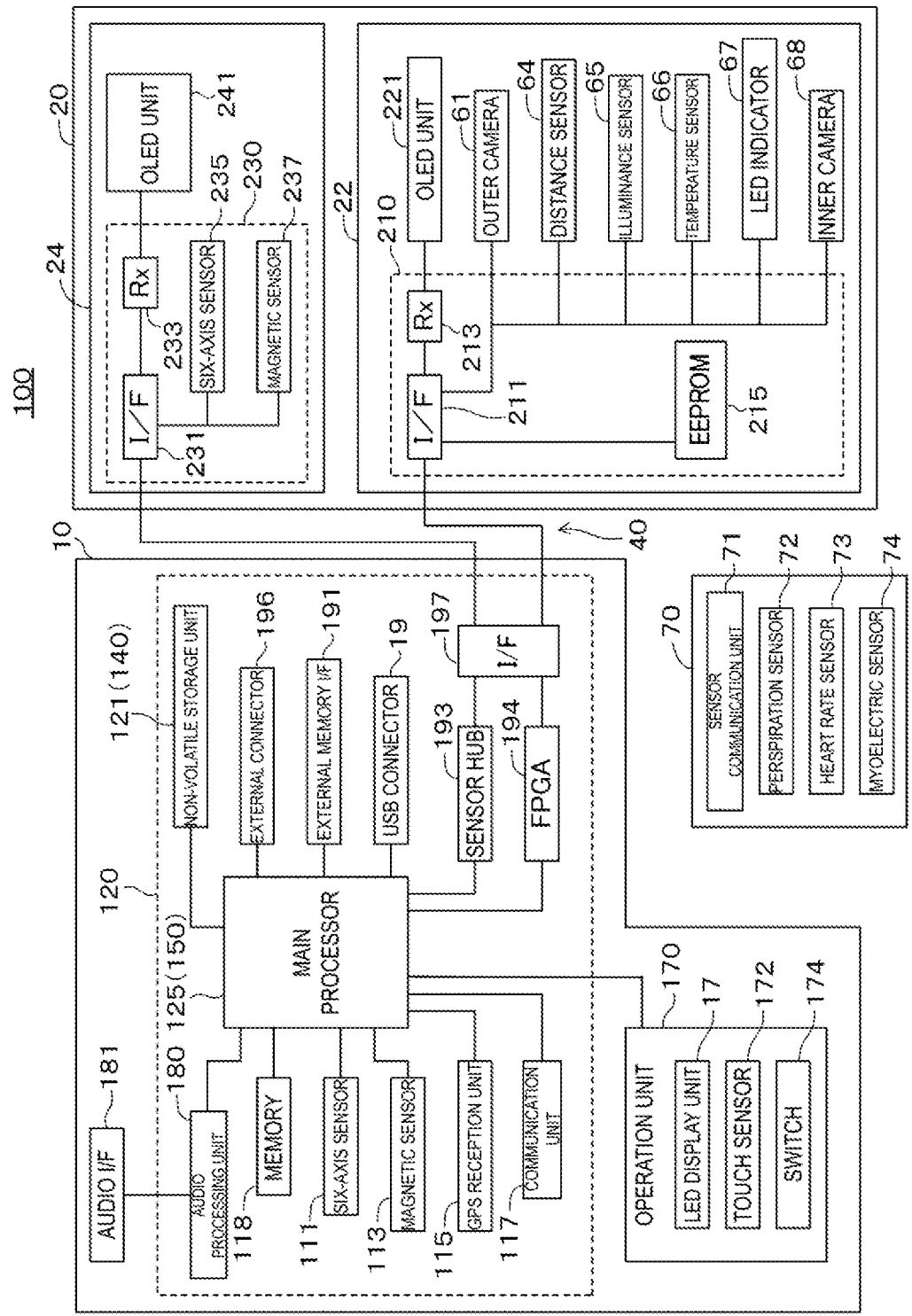
FIG. 4 is a block diagram of the HMD.

FIG. 4 is a block diagram illustrating a configuration of each component included in the HMD 100.

A controller 10 includes a main processor 125 configured to execute a program to control the HMD 100. The main processor 125 is coupled with a memory 118 and a non-volatile storage unit 121. The main processor 125 is coupled with an operation unit 170 as an input device. The main processor 125 is coupled with sensors including a six-axis sensor 111, a magnetic sensor 113, and a GPS reception unit 115.

The main processor 125 is coupled with a communication unit 117, an audio processing unit 180, an external memory interface 191, an USB connector 19, a sensor hub 193, and an FPGA 194. These components function as an interface to external devices. Note that, in the drawings, the interface is abbreviated as I/F.

The main processor 125 is mounted on a controller substrate 120 built into the controller 10. In the exemplary embodiment, the six-axis sensor 111, the magnetic sensor 113, the GPS reception unit 115, the communication unit 117, the memory 118, the non-volatile storage unit 121, the audio processing unit 180, or the like are mounted on the controller substrate 120. The external memory interface 191, the USB connector 19, the sensor hub 193, the FPGA 194, and an interface 197 may be mounted on the controller substrate 120. Moreover, the connector 42 and the USB connector 19 may be mounted on the controller substrate 120.

The memory 118 configures a work area used to temporarily store a program to be executed by the main processor 125, and data to be processed by the main processor 125, or the like. The non-volatile storage unit 121 includes a flash memory and an embedded Multimedia Card (eMMC). The non-volatile storage unit 121 is configured to store programs to be executed by the main processor 125 and data to be processed by the main processor 125.

The operation unit 170 includes an LED display unit 17, a touch sensor 172, and a switch 174. The touch sensor 172 is configured to detect a touch operation performed by the user U, identify a position of the operation, and output an operation signal to the main processor 125. The switch 174 is configured to output operation signals to the main processor 125 in response to the operations of the up-down key 15 and the power switch 18. The LED display unit 17 turns on, flashes, or turns off the LED in accordance with the control by the main processor 125. The operation unit 170 is, for example, a switch substrate on which the LED display unit 17, the touch sensor 172, the switch 174, and a circuit for controlling these are mounted, and is accommodated in the main body 11.

The six-axis sensor 111 is an example of a motion sensor configured to detect a movement of the controller 10. The motion sensor can be reworded as an inertial sensor. The six-axis sensor 111 includes a three-axis acceleration sensor and a three-axis gyro sensor. The six-axis sensor 111 may adopt an Inertial Measurement Unit (IMU) with the sensors described above, formed into a module.

The magnetic sensor 113 is a three-axis geomagnetic sensor, for example.

The Global Positioning System (GPS) reception unit 115 includes a GPS antenna (not illustrated) and is a receiver configured to receive a radio signal transmitted from a GPS satellite. The GPS reception unit 115 detects or calculates coordinates of a current position of the controller 10, based on a GPS signal.

The six-axis sensor 111, the magnetic sensor 113, and the GPS reception unit 115 output an output value to the main processor 125 in accordance with a predetermined sampling cycle. Further, the six-axis sensor 111, the magnetic sensor 113, and the GPS reception unit 115 may be configured to output, in response to a request from the main processor 125, detected values to the main processor 125 at a timing specified by the main processor 125.

The communication unit 117 is a communication device configured to execute wireless communication with an external device. The communication unit 117 includes an antenna (not illustrated), an RF circuit, a baseband circuit, a communication control circuit, or the like, and may be a device in which the above-described components are integrated. Further, the communication unit 117 may be a communication module substrate on which various types of circuits are mounted. The communication unit 117 is configured to perform wireless communications conforming to the standard of Bluetooth (registered trademark), wireless LAN (including Wi-Fi (registered trademark)), or the like. The communication unit 117 executes communication with the server 400 illustrated in FIG. 1. Furthermore, the communication unit 117 is configured to communicate with the sensor unit 70.

The audio interface 181 configured to input and output an audio signal is coupled with the audio connector 46 to input and output an audio signal. The audio processing unit 180 encodes/decodes an audio signal input/output by the audio interface 181. The audio processing unit 180 may include an A/D converter configured to convert analog audio signals into digital audio data, and a D/A converter configured to convert the digital audio data into the analog audio signals.

The external memory interface 191 serves as an interface configured to be coupled with a portable memory device and includes, for example, a memory card slot configured to be attached with a card-type recording medium to read data, and an interface circuit.

The interface 197 couples the sensor hub 193 and the FPGA (Field Programmable Gate Array) 194 to the image display unit 20.

The sensor hub 193 is configured to acquire detected values of the various sensors included in the image display unit 20 and to output the detected values to the main processor 125. The FPGA 194 is configured to process data to be transmitted and received between the main processor 125 and each component of the image display unit 20, as well as to execute transmissions via the interface 197.

The sensor unit 70 includes a sensor communication unit 71, a perspiration sensor 72, a heart rate sensor 73, and a myoelectric sensor 74. The perspiration sensor 72 is a sensor that detects the perspiration state of the user U. For example, the perspiration sensor 72 contacts the epidermis of the user U, and detects electrical conductivity in the epidermis, thereby outputting a value indicative of the presence or absence of perspiration, the degree of perspiration, or the like. The heart rate sensor 73 is a sensor that detects the heart rate of the user U. The heart rate sensor 73 is, for example, a sensor that optically detects the pulsation of the blood vessel of the user U, or a sensor that detects fluctuations in blood pressure. The myoelectric sensor 74 is a sensor that detects the electric potential of the muscles of the user U, so-called myoelectric potential, at the position where the sensor unit 70 is mounted. The myoelectric sensor 74 may include a probe (not illustrated) mounted to the body of the user U at a location remote from the sensor unit 70. The perspiration sensor 72, the heart rate sensor 73, and the myoelectric sensor 74 may use known sensors. The sensor communication unit 71 performs wireless communication with the communication unit 117 using Bluetooth, for example. The sensor communication unit 71 transmits the detected value and the detection result of the perspiration sensor 72, the heart rate sensor 73, and the myoelectric sensor 74 to the controller 10 at a predetermined cycle.

The configuration of the sensor unit 70 is not limited, and may be configured to include other sensors capable of detecting information about the body of the user U and information about the state of the user U. For example, the sensor unit 70 may include a temperature sensor that detects the body temperature of the user U and a blood pressure sensor that detects blood pressure. Additionally, the sensor unit 70 may also include a motion sensor to detect the body movement of the user U.

With the coupling cable 40 and wires (not illustrated) inside the image display unit 20, the controller 10 is separately coupled with the right display unit 22 and the left display unit 24.

The right display unit 22 includes an Organic Light Emitting Diode (OLED) unit 221 configured to emit imaging light. The imaging light emitted by the OLED unit 221 is guided to the right light-guiding plate 26 by an optical system including a lens group or the like. The left display unit 24 includes an OLED unit 241 configured to emit imaging light. The imaging light emitted by the OLED unit 241 is guided to the left light-guiding plate 28 by an optical system including a lens group or the like.

The OLED units 221 and 241 include an OLED panel and a drive circuit configured to drive the OLED panel. The OLED panel is a self-luminous type display panel including light-emitting elements arranged in a matrix, in which each element is configured to emit red (R) color light, green (G) color light, or blue (B) color light, by organic electroluminescence. The OLED panel includes a plurality of pixels, each pixel including an R element, a G element, and a B element, arranged in a matrix to form an image. The drive circuit is controlled by the control unit 150 to select and power the light-emitting elements of the OLED panel to cause the light-emitting elements of the OLED panel to emit light. Thus, imaging light of an image formed by the OLED units 221 and 241 is guided to the right light-guiding plate 26 and the left light-guiding plate 28 to enter the right eye RE and the left eye LE.

The right display unit 22 includes a display unit substrate 210. The display unit substrate 210 is mounted with an interface 211 coupled with the interface 197, a reception unit 213 configured to receive data entered from the controller 10 via the interface 211, and an EEPROM 215. The interface 211 couples the reception unit 213, the EEPROM 215, a temperature sensor 66, the outer camera 61, the illuminance sensor 65, and the LED indicator 67, to the controller 10. Note that in the drawings, the reception unit is abbreviated as Rx.

The Electrically Erasable Programmable Read-Only Memory (EEPROM) 215 stores data so as to be readable by the main processor 125. The EEPROM 215 stores, for example, data about light-emitting properties and display properties of the OLED units 221 and 241 provided in the image display unit 20, and data about properties of a sensor provided in the right display unit 22 or the left display unit 24, or the like. Specifically, the EEPROM 215 stores parameters regarding gamma correction performed by the OLED units 221 and 241, and data used to compensate for the detected values by the temperature sensors 69 and 239, or the like. These data are generated when the HMD 100 is inspected before shipping from a factory, and written into the EEPROM 215. After shipment, the main processor 125 can use the data in the EEPROM 215 to perform processing.

The outer camera 61 captures an image and outputs captured image data or a signal indicative of the result of imaging to the interface 211.

The distance sensor 64 measures the distance to the object located in the detection range of the distance sensor 64, and outputs the measurement result to the interface 211.

The illuminance sensor 65 is configured to output a detected value corresponding to the amount and/or intensity of received light to the interface 211.

The temperature sensor 66 is configured to detect a temperature and output, to the interface 211, a voltage value or a resistance value corresponding to the detected temperature as a detected value. The temperature sensor 66 is mounted on a rear face of the OLED panel included in the OLED unit 221, or on the same substrate as the drive circuit driving the OLED panel, and detects the temperature of the OLED panel. Further, when the OLED panel is an Si-OLED and is implemented, together with the drive circuit or the like, as an integrated circuit on an integrated semiconductor chip, the temperature sensor 66 may be mounted on this semiconductor chip.

The LED indicator 67 turns on and off in accordance with a signal input via the interface 211.

The inner camera 68 captures an image and outputs captured image data or a signal indicative of the imaging result to the interface 211.

The reception unit 213 is configured to receive data transmitted by the main processor 125 via the interface 211. Upon receiving image data from the interface 211, the reception unit 213 outputs the received image data to the OLED unit 221.

The left display unit 24 includes a display unit substrate 230. The display unit substrate 230 is mounted with an interface 231 coupled with the interface 197, and a reception unit 233 configured to receive data input from the controller 10 via the interface 231. Furthermore, the display unit substrate 230 is mounted with a six-axis sensor 235 and a magnetic sensor 237. The interface 231 couples the reception unit 233, the six-axis sensor 235 and the magnetic sensor 237 to the controller 10.

The six-axis sensor 235 is an example of a motion sensor configured to detect a motion of the image display unit 20. The six-axis sensor 235 includes a three-axis acceleration sensor and a three-axis gyro sensor. The six-axis sensor 235 may be an IMU with the sensors described above, formed into a module.

The magnetic sensor 237 is a three-axis geomagnetic sensor, for example.

In addition, a temperature sensor (not illustrated) is mounted on a rear face of the OLED panel, or on the same substrate as the drive circuit driving the OLED panel. This temperature sensor detects the temperature of the OLED panel. When the OLED panel is an Si-OLED and is implemented, together with the drive circuit or the like, as an integrated circuit on an integrated semiconductor chip, the temperature sensor may be mounted on this semiconductor chip.

The outer camera 61, the distance sensor 64, the illuminance sensor 65, the temperature sensor 66, the inner camera 68, the six-axis sensor 235, and the magnetic sensor 237 are coupled with the sensor hub 193 of the controller 10. Control signals are input from the sensor hub 193 into each of these sensors. The LED indicator 67 is also coupled with the sensor hub 193.

The sensor hub 193 is configured to follow a control by the main processor 125 and to set and initialize sampling cycle of each sensor. In accordance with the sampling cycle of the sensors, the sensor hub 193 supplies power to the sensors, transmits control data, and acquires detected values or the like. At a predetermined timing, the sensor hub 193 outputs detected values of each sensor to the main processor 125. The sensor hub 193 may include a function of temporarily holding detected values of each sensor in accordance with a timing of output to the main processor 125. The sensor hub 193 may include a function of responding to a difference in signal format of output values of each sensor or in data format, converting data in a format into data in a unified data format, and outputting the converted data to the main processor 125.

The sensor hub 193 starts and stops supplying power to the LED indicators 67 under the control of the main processor 125 and causes the LED indicator 67 to light or flash in accordance with a timing when the outer camera 61 begins and ends imaging.

Figure 5:
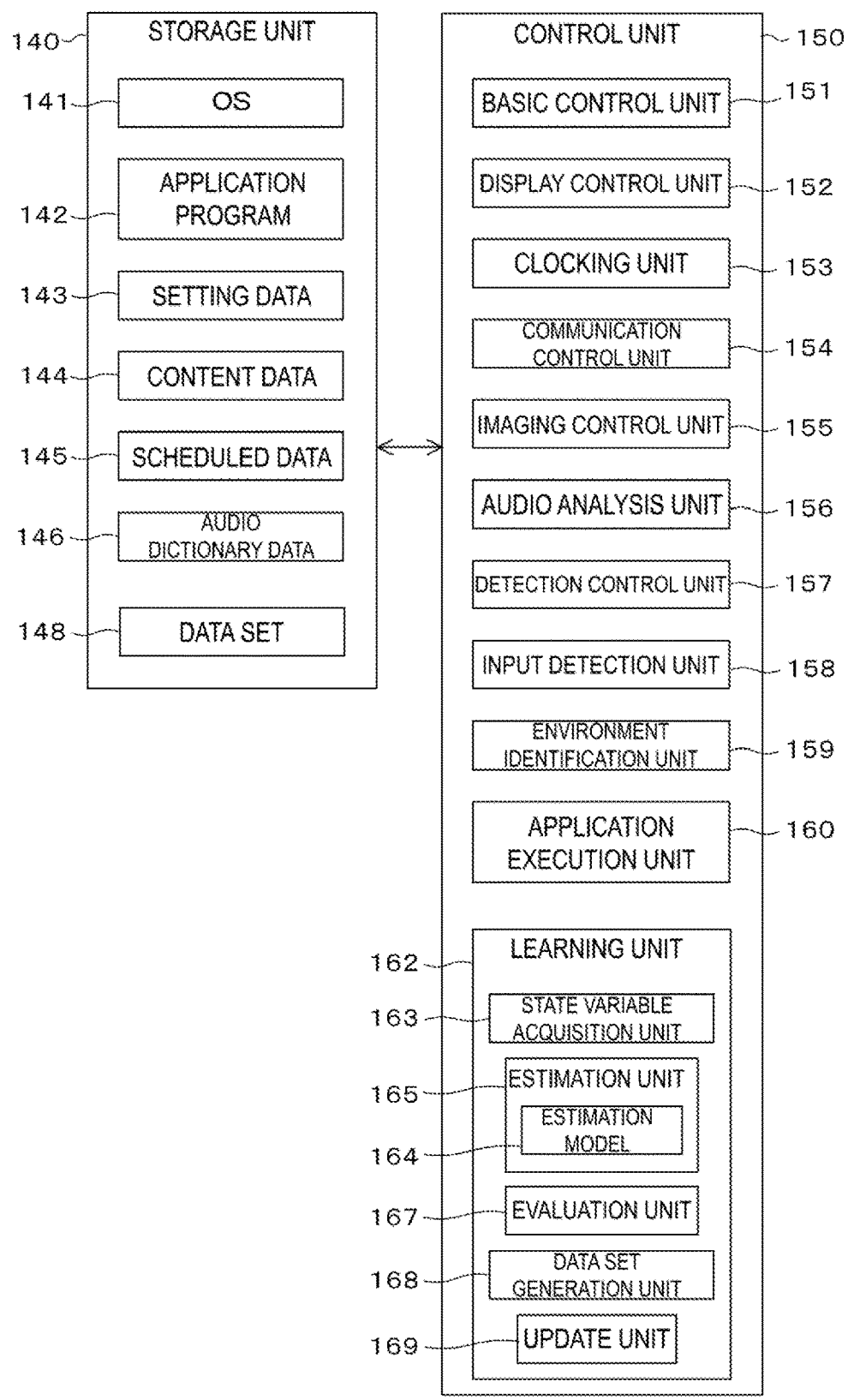
FIG. 5 is a functional block diagram of a control unit.

FIG. 5 is a functional block diagram of a control system of the HMD 100 which includes a storage unit 140 and the control unit 150. The storage unit 140 is a logical storage unit configured of the non-volatile storage unit 121, and may include the EEPROM 215. The control unit 150 and various functional units included in the control unit 150 are formed by the cooperation of software and hardware when the main processor 125 executes a program. The control unit 150 and each functional unit included in the control unit 150 include for example, the main processor 125, the memory 118, and the non-volatile storage unit 121.

The storage unit 140 stores various types of programs to be executed by the main processor 125 and data to be processed by these programs.

The storage unit 140 stores an operating system 141, an application program 142, setting data 143, content data 144, scheduled data 145, audio dictionary data 146, and a data set 148. The operating system is abbreviated as OS in the figure.

The control unit 150 executes the programs stored in the storage unit 140 and processes the data stored in the storage unit 140 to control the HMD 100.

The operating system 141 is a basic control program for the HMD 100, executed by the main processor 125. As the power switch 18 is operated, and the power supply to the HMD 100 is turned on, the main processor 125 loads and executes the operating system 141. When the main processor 125 executes the operating system 141, various types of functions of the control unit 150 are achieved.

The functions of the control unit 150 include the basic control unit 151, the display control unit 152, the clocking unit 153, the communication control unit 154, the imaging control unit 155, the audio analysis unit 156, the detection control unit 157, the input detection unit 158, and the environment identification unit 159. Further, the functions achieved by the operating system 141 include an application execution unit 160.

Furthermore, the control unit 150 functions as a learning unit 162. The learning unit 162 includes a state variable acquisition unit 163, an estimation unit 165 including an estimation model 164, an evaluation unit 167, a data set generation unit 168, and an update unit 169.

The application program 142 is a program to be executed by the main processor 125 while the main processor 125 executes the operating system 141. The application program 142 utilizes various types of functions of the control unit 150. The application program 142 stored in the storage unit 140 is not limited to one program and may be plural. For example, the application program 142 achieves functions such as image content playback, audio content playback, games, camera filming, document creating, web browsing, schedule management, audio communication, telephone, image communication, and route navigation.

The storage unit 140 may store a plurality of application programs 142, each program being executed independently by the application execution unit 160, or in connection with each other.

The setting data 143 includes various set values regarding operation of the HMD 100. The setting data 143 may include parameters, determinants, computing equations, Lookup Tables (LUTs), or the like when the control unit 150 controls the HMD 100 and use them.

The setting data 143 includes data used when the application program 142 is executed in the HMD 100. For example, the setting data 143 includes data that defines a condition for executing the application program 142. Specifically, the setting data 143 includes a condition for starting execution of the application program 142 with respect to the application program 142 set to be executed when a predetermined condition is satisfied. For example, the setting data 143 may include data indicative of, a size of an image to be displayed, an orientation of a screen when the application program 142 is executed, and a functional unit of the control unit 150 to be used by the application program 142, or sensors of the HMD 100, or the like.

To introduce the application program 142, the HMD 100 uses a function of the control unit 150 to execute an installation process. The installation process is a process that includes not only storing of the application program 142 in the storage unit 140, but also setting of an execution condition of the application program 142 or the like. When setting data 143 corresponding to the application program 142 is generated or stored in the storage unit 140 by the installation process, the application execution unit 160 can start the application program 142.

The content data 144 is data of the contents including images and videos to be displayed on the image display unit 20 through control by the control unit 150. The content data 144 may include data of a plurality of contents. The content data 145 may be data of bidirectional content. For example, when the image display unit 20 displays contents, a display format of the contents or the contents themselves are switched, in accordance with an operation by the user U to the controller 10. In this case, the content data 144 may include, together with the data of the contents, image data of a menu screen to be displayed when an operation is received, data determining a process or the like corresponding to an item included in the menu screen, or the like. The content data 144 may be data acquired by the HMD 100 from the server 400, or may be data acquired via the external memory interface 191 or USB connector 19.

The basic control unit 151 executes a basic function controlling each unit of the HMD 100. Upon turning on the power supply to the HMD 100, the basic control unit 151 executes a start process to initialize each unit of the HMD 100 to allow the application execution unit 160 to be capable of executing the application program. Upon turning off the power supply to the controller 10, the basic control unit 151 executes a shut-down process to terminate the application execution unit 160, update various data stored in the storage unit 140, and stop the HMD 100. In the shut-down process, power to the image display unit 20 also stops, wholly shutting down the HMD 100. The basic control unit 151 may have a function of controlling power supply to each unit of the HMD 100.

The display control unit 152 is configured to create a control signal for controlling the right display unit 22 and the left display unit 24, and control the creation and emission of the imaging light by each of the right display unit 22 and the left display unit 24. For example, the display control unit 152 causes the OLED panel to execute display of an image and controls an image-drawing timing, the brightness or the like, on the OLED panel.

The display control unit 152 may perform an image process based on image data of an image or video displayed by the image display unit 20. The image process includes a process of creating a signal to be transmitted to each of the right display unit 22 and the left display unit 24. Signals created by the display control unit 152 may include a vertical synchronizing signal, a horizontal synchronizing signal, a clock signal, an analog image signal, and the like. The image process performed by the display control unit 152 may include a resolution conversion process of converting the resolution of the image data into a resolution suitable for the right display unit 22 and the left display unit 24. The image process may also include an image adjustment process of adjusting a brightness and chroma of the image data, a 2D/3D conversion process of creating 2D image data from 3D image data, or creating 3D image data from 2D image data, and the like. When having performed these image processes, the display control unit 152 generates signals for displaying images based on the processed image data and transmits the signals to the image display unit 20. The display control unit 152 may perform the image process with a function realized by the operating system 141 caused to be performed by the main processor 125. In addition, hardware that performs some or all of the functions of the display control unit 152 may be composed of hardware separate from the main processor 125. Examples of the hardware include a Digital Signal Processor (DSP).

The clocking unit 153 measures time. For example, the clocking unit 153 operates as a Real Time Clock (RTC) to measure the current time. In this case, the clocking unit 153 outputs a time in response to a request of the basic control unit 151 or the detection control unit 157, or in a preset cycle.

The communication control unit 154 performs data communication by the communication unit 117. The communication control unit 154 controls a communication function provided in the communication unit 117 to perform data communication with a device at a specified communication destination. For example, the communication control unit 154 communicates with the server 400 using the communication unit 117. The communication control unit 154 also communicates with the sensor unit 70 using the communication unit 117, for example. The basic control unit 151 and the application execution unit 160 transmit and receive data to and from other devices through a function of the communication control unit 154, and can use the received data, for example.

The imaging control unit 155 controls the outer camera 61 to perform capturing an image to create captured image data, and temporarily stores the data in the storage unit 140. When the outer camera 61 is configured as a camera unit including a circuit configured to create captured image data, the imaging control unit 155 acquires the captured image data from the outer camera 61, and temporarily stores the captured image data in the storage unit 140.

The imaging control unit 155 controls the inner camera 68 to perform capturing an image to create captured image data, and temporarily stores the data in the storage unit 140. When the inner camera 68 is configured as a camera unit including a circuit configured to create captured image data, the imaging control unit 155 acquires the captured image data from the inner camera 68, and temporarily stores the captured image data in the storage unit 140.

The detection control unit 157 acquires detected values of various sensors input from the FPGA 194. The detection control unit 157 may perform detection for a surrounding environment of the HMD 100, based on the detected values of the various sensors. For example, the detection control unit 157 detects the brightness around the HMD 100 from an image captured by the outer camera 61 or a detected value of the illumination sensor 65. The detection control unit 157 corresponds to an example of the detector.

The detection control unit 157 detects the line-of-sight direction of the user U. For example, the detection control unit 157 detects an image of each of the right eye RE and the left eye LE of the user U from an image captured by the inner camera 68. Specifically, when reflected light reflected on the pupil or the surface of the eyeball of the right eye RE and the left eye LE is detected from the captured image, the line-of-sight direction can be detected by using a known technique. The detection control unit 157 may detect the line-of-sight direction of the user U by detecting an orientation of the head of the user U from the image captured by the outer camera 61. The line-of-sight direction may be detected based on both the line-of-sight direction detected from the image captured by the outer camera 61 and the line-of-sight direction detected from the image captured by the inner camera 68. The line-of-sight direction detected by the detection control unit 157 may be an orientation of each of the right eye RE and the left eye LE, and may be a direction in which the user U fixates with both the right eye RE and the left eye LE.

The detection control unit 157 may detect a size of a pupil of each of the right eye RE and the left eye LE based on an image captured by the inner camera 68. In this case, the detection control unit 157 may detect a state of miotic or mydriatic of the user U based on change in pupil size. The detection control unit 157 also may detect the open/closed state of eyelids of the right eye RE and left eye LE based on an image captured by the inner camera 68.

In addition, the detection control unit 157 may detect an operation using a gesture operation by the user U. The gesture operation is also referred to as an action User Interface (UI), and includes an operation in which the user U moves an indication body and an operation in which the indication body is shaped into a specified shape, and these operations are optically detected by the HMD 100. The indication body is a part of the body of the user U, such as a hand, a finger, and a leg, however, the indication body may also be a rod-shaped or ball-shaped device. When the gesture operation is performed within the imaging range of the outer camera 61, the outer camera 61 can capture an image of the indication body operated. The detection control unit 157 extracts an image of the indication body from image data captured by the outer camera 61 using a pattern recognition process and the like, and acquires a shape of the indication body and a change of the indication body in shape or position from the extracted image. When each of the acquired shape of the indication body and the change of the indication body in shape or position conforms to an aspect of a pre-set gesture operation, the detection control unit 157 detects the operation.

The detection control unit 157 acquires detected values of the perspiration sensor 72, the heart rate sensor 73, and the myoelectric sensor 74, transmitted by the sensor unit 70.

Here, the detection control unit 157 also may process the detection results of the plurality of sensors in a complex manner. For example, the detection control unit 157 may determine an evaluation value of movement of the user U based on a detection result of the myoelectric sensor 74 and detection results of the six-axis sensor 111 and/or the six-axis sensor 235. The detection control unit 157 identifies the movement of the user U from the detection results of the six-axis sensors 111 and 235, and identifies a muscle movement of the user U from the detection result of the myoelectric sensor 74. The detection control unit 157 compares the movement of the user U with the muscle movement of the user U to determine a level of muscle strength added. For example, it is determined whether the muscle strength exhibited by the user U is too large, proper, or below an appropriate level, for the movement of the user U.

The detection control unit 157 functions as a detector for detecting a state of the body of the user U. The detection control unit 157 may constitute the detector together with sensors. Examples of the sensors constituting the detector together with the detection control unit 157 include each of the sensors connected to FPGA 194, for example. Specifically, the sensors are the inner camera 68 and the six-axis sensor 235. In addition, the sensors constituting the detection unit together with the detection control unit 157 may include the outer camera 61, the distance sensor 64, the six-axis sensor 111, and the like. The sensor constituting the detector together with the detection control unit 157 may be the microphone 63 connected to the audio interface 181, or may include the perspiration sensor 72, the heart rate sensor 73, and the myoelectric sensor 74.

The input detection unit 158 detects an input from the user U. The input detection unit 158 detects an operation by the user U on the HMD 100, based on an operation signal output by the operation unit 170.

The input detection unit 158 may detect, as input, detected values of the various sensors acquired by the detection control unit 157, and a line-of-sight of the user U, a state of a pupil, a state of open/closed state of eyelids, and the like, detected by the detection control unit 157. When the detection control unit 157 detects a gesture operation of the user U, the input detection unit 158 accepts content of the gesture operation as input. The input detection unit 158 corresponds to an example of the input unit.

The input detection unit 158 may receive audio input of the user U by acquiring audio data collected by the microphone 63 from the audio processing unit 180. In other words, the input detection unit 158 may receive input of the user U using an audio command.

The input detection unit 158 also may detect a heart rate, a respiration rate, a depth of respiration, a breathing rate, and the like, detected from audio collected by the microphone 63, to receive the detection results as input. In addition, the input detection unit 158 may determine body condition of the user U based on these detection results to receive the determination result as input. For example, when the detection results and the determination result of the body condition of the user U indicate that the user U is in a state of a high level of excitement, the input detection unit 158 may detect input for rejecting a process or an operation performed by the HMD 100.

The input detection unit 158 may detect, as input, the line-of-sight direction of each of the right eye RE and the left eye LE of the user U identified by the detection control unit 157 using the inner camera 68, or change in the line-of-sight direction. It is known that human line-of-sight includes fine movement called involuntary eye movement or microsaccade. It is also known that the microsaccade tends to occur at high frequency in a direction to which a person pays attention. When a field of view of the user U is split into a plurality of regions and a frequency of appearance of the microsaccade in each of the regions is acquired by using the phenomenon above, a direction to which the user U pays conscious attention can be identified. The detection control unit 157 acquires a frequency of appearance of the microsaccade for each direction, for each of the right eye RE and the left eye LE of the user U, based on an image captured by the inner camera 68, and identifies a gaze direction of the user U. The input detection unit 158 may acquire the gaze direction determined by the detection control unit 157 as input from the user U.

The environment identification unit 159 analyzes an image captured by the outer camera 61 and/or a detected value of the illuminance sensor 65 to identify environment around the HMD 100. For example, the environment identification unit 159 identifies whether the HMD 100 is indoors or outdoors. The environment identification unit 159 also may identify whether the HMD 100 is at a specific preset place. Specifically, it may be identified whether the HMD 100 is at a preset place, such as a home, a room, a workplace, or the like of the user U. In addition, the environment identification unit 159 may identify the environment around the HMD 100 in more detail. For example, the environment around the HMD 100 may be identified as on a road, a parking lot, a park, a toilet, a bathroom, a bedroom, a dining room, a food store, a retail store, a factory, a laboratory, a conference room, an event hall, etc.

The process in which the input detection unit 158 detects input using an action or a gesture of the user U from an image captured by the outer camera 61, and the environment identification unit 159 identifies environment from an image captured the outer camera 61, may be performed simultaneously, parallel, or at different timings by one processing unit. In the example described in the present embodiment, the input detection unit 158 extracts an image of the user U from an image captured by the outer camera 61, and detects input from the user U. The input detection unit 158 calculates movement of the image display unit 20 provided with the outer camera 61 based on change in a background in an image captured by the outer camera 61 or in an image around the user U, and detects input of the user U. In contrast, the environment identification unit 159 extracts and analyzes an image around the user U from the image captured by the outer camera 61, and identifies environment.

The application execution unit 160 corresponds to a function executing the application program 142 while the main processor 125 causes the operating system 141 to be performed. The application execution unit 160 executes the application program 142 to achieve various functions of the application program 142. During the execution of the application program 142, the application execution unit 160 utilizes a function of each component of the control unit 150. The application execution unit 160 corresponds to an example of the processing unit.

In the HMD 100, the application program 142 executed by the application execution unit 160 corresponds to the process performed by the processing unit. In this case, a type of the application program 142 corresponds to a type of the process. The type of the process may be information identifying the application program 142, or may be information indicating a type of the application program 142 classified. When the application program 142 has multiple functions, the type of the process may be interpreted as a function of the application program 142.

The application execution unit 160 executes the application program 142 in accordance with conditions set in the setting data 143. As described above, some application programs 142 executable by the HMD 100 are executed when the set conditions are satisfied.

As the conditions for executing the application program 142, the application execution unit 160 acquires a time output from the clocking unit 153, a detection result acquired and detected by the detection control unit 157, and input detected by the input detection unit 158.

For example, the application execution unit 160 executes the application program 142 related to power supply control when movement of mounting the HMD 100 is detected at a time corresponding to a time when the user U awakes. The application program 142 related to power source control switches a power source of the HMD 100 between a sleep state and a power-on state. The application program 142 related to power supply control shifts the HMD 100 to the sleep state in response to detecting operation of placing the HMD 100, and then shifts the HMD 100 to the power-on state in response to detecting operation of lifting the HMD 100.

For example, the application execution unit 160 executes the application program 142 related to health management at a time corresponding to a time when the user U awakes. Based on detected values of the sensor unit 70, the application program 142 acquires and records a body temperature, a heart rate, a blood pressure, and the like of the user U, and causes the image display unit 20 to display the acquired data and total results of the acquired data.

For example, the application execution unit 160 executes the application program 142 related to meal management at a time corresponding to breakfast time of the user U. The application program 142 related to meal management identifies contents of a meal based on an image captured by the outer camera 61 to identify and record nutritional components taken by the user U, and causes the image display unit 20 to display the identified data and total results of the identified data.

For example, the application execution unit 160 executes the application program 142 related to a life record, i.e., a life log, at a time corresponding to a time for the user U to go to work. The application program 142 related to a life log identifies and records intensity and time of movement of the user U based on detected values of the heart rate sensor 73, the six-axis sensor 111, and the six-axis sensor 235. The recorded data and total results of the recorded data are then displayed in the image display unit 20.

The application program 142 related to a life log also determines the level of stress and fatigue of the user U based on the perspiration sensor 72 and detected values of the perspiration sensor 72, and records the determination, and then displays the determination results and total results of the determination results on the image display unit 20.

For example, the application execution unit 160 executes the application program 142 related to providing information when the input detection unit 158 detects the audio command. The application program 142 related to providing information executes providing weather information, news, traffic information, route guide for transportation, navigation by map, and the like. This application program 142 acquires the content data 403 necessary to provide the information above from the server 400, as needed.

When execution conditions of the application program 142 having been satisfied triggers execution of the application program 142 by the application execution unit 160, the display control unit 152 displays an image of an execution guide.

Figure 6:
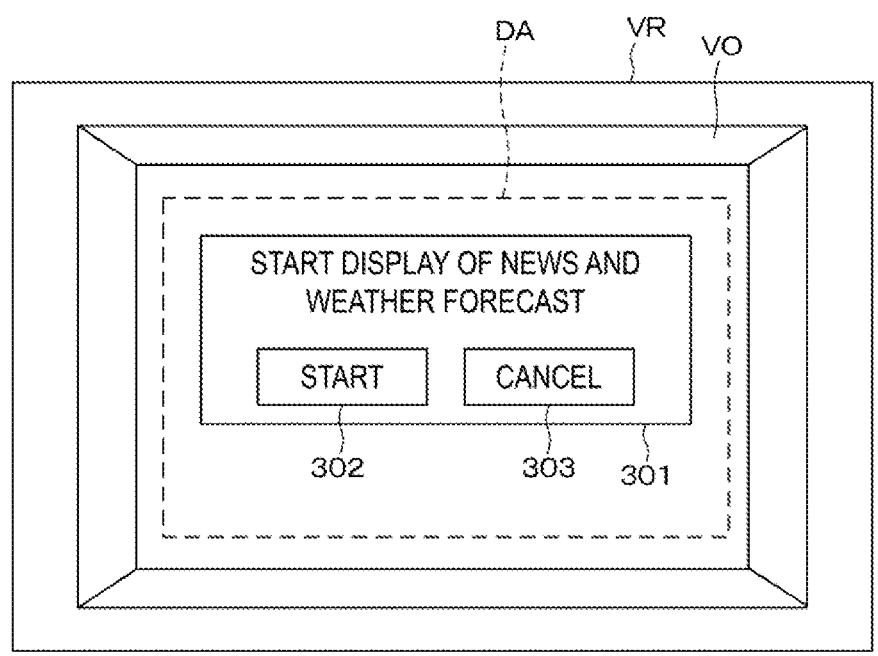
FIG. 6 is a diagram illustrating an example of a screen displayed by the HMD.

FIG. 6 is a diagram illustrating an example of an image displayed by the HMD 100, and illustrates an example of an information display screen 301 displayed before the application program 142 is executed.

In FIG. 6, the symbol VR denotes a field of view of the user U when the image display unit 20 is worn on the head of the user U. The HMD 100 is a see-through type display, so that the field of view VR includes an external scene VO.

The image display unit 20 includes an image display region DA overlapping with the external scene VO. The image display region DA is a region in which an image displayed by the HMD 100 using the right light-guiding plate 26 and the left light-guiding plate 28 is visible to the user U.

The information display screen 301 includes character information and an image, indicating contents and a type of the application program 142 to be executed by the application execution unit 160. In other words, the information display screen 301 notifies the user U of the application program 142 to be executed before the application program 142 is executed.

The information display screen 301 includes instruction operation units 302 and 303. The instruction operation unit 302 is configured to instruct the application program 142 notified by the information display screen 301 to be executed. The instruction operation unit 303 is configured to instruct the application program 142 notified by the information display screen 301 not to be executed.

When the detection control unit 157 detects an operation on the instruction operation unit 302, the input detection unit 158 receives an input allowing execution of the application program 142. In this case, the application execution unit 160 executes the application program 142 with a trigger having occurred.

When the detection control unit 157 detects an operation on the instruction operation unit 303, the input detection unit 158 receives an input rejecting execution of the application program 142. In this case, the application execution unit 160 does not execute the application program 142 with the trigger having occurred.

The operations on the respective instruction operation units 302 and 303 are detected by the touch sensor 172, for example. The detection control unit 157 may detect the operations on the respective instruction operation units 302 and 303 by detecting a gesture operation from an image captured of the outer camera 61. For example, when the user U operates to move its hand or finger to at a position overlapping with the instruction operation unit 302 or 303, being visible in the field of view VR, operation on the instruction operation unit 302 or 303 may be detected. In this case, the detection control unit 157 may identify the position of the hand and finger of the user U from an image captured of the outer camera 61, and then the input detection unit 158 may determine whether the identified position overlaps with the display position of the instruction operation unit 302 or 303.

4. Learning Function

The learning unit 162 performs machine learning based on various detected values during operation of HMD 100 to generate the estimation model 164, and performs estimation using the estimation model 164.

The estimation model 164 of the present embodiment is configured to estimate whether the user U operates the instruction operation unit 302 or 303 when the information display screen 301 is displayed, and is a so-called learning model generated by machine learning.

The learning unit 162 is, for example, an Artificial Intelligence (AI) that performs the estimation model 164 and learning of the estimation model 164. The learning unit 162 is composed of software or hardware constituting a neural network, performs depth learning, and constitutes the estimation model 164. The estimation model 164 may be configured as a program executed by the estimation unit 165, and stored in the storage unit 140.

The state variable acquisition unit 163 acquires a state variable. The state variable acquired by the state variable acquisition unit 163 includes a detection result of the detection control unit 157 and environment identified by the environment identification unit 159. For example, the state variable includes a detected value of movement detected by the six-axis sensor 111 and the six-axis sensor 235. The state variable also may include a time at which the clocking unit 153 outputs. For example, the state variable may include a detection result of one or more of the perspiration sensor 72, the heart rate sensor 73, and the myoelectric sensor 74. The state variable may include a direction of each of the line-of-sights RD and LD, detected by the detection control unit 157, for example. For example, the state variable may also include a detection result of a state of a pupil of the user U detected by the detection control unit 157. In addition, the state variable may include detected values of the distance sensor 64, the illuminance sensor 65, and the temperature sensor 66, for example. The state variable may also include a result of detection performed by the detection control unit 157 in a complex manner, and may include a determination result of muscle strength based on detection results of the six-axis sensors 111 and 235, and the myoelectric sensor 74, for example. The state variable may also include a result obtained by the input detection unit 158, including a gaze direction based on microsaccade of each of the right eye RE and the left eye LE, determined by the detection control unit 157. The state variable may also include a detection result such as a heart rate, a respiration rate, a depth of respiration, and a breathing rate, and the like, detected by the input detection unit 158 from audio collected by the microphone 63, or a body state of the user U determined based on these detection results.

In addition, the state variables may include a type of the application program 142 to be executed by the application execution unit 160, for example.

As a typical example, the state variable includes a time at which the clocking unit 153 outputs, environment identified by the environment identification unit 159, and a type of the application program 142 to be executed by the application execution unit 160.

The estimation unit 165 inputs a state variable acquired by the state variable acquisition unit 163 to the estimation model 164, and performs estimation. In a state without learning performed by the learning unit 162 and in the beginning of the learning, the estimation model 164 is in an initial state.

The evaluation unit 167 evaluates an estimated result of the estimation unit 165. The evaluation unit 167 compares the estimated result of whether the user U operates the instruction operation unit 302 or 303 with actual input of the user U detected by the input detection unit 158 to provide an evaluation value to the estimated result of the estimation unit 165. The evaluation value may be set for each of two cases where the estimated result of the estimation unit 165 coincides with the actual input of the user U, and where the estimated result does not coincide therewith. The evaluation value may be also a ratio indicating a degree of coincidence with display in the information display screen 301 in multiple times.

The data set generation unit 168 generates the data set 148 in which the state variable acquired by the state variable acquisition unit 163 and provided to the estimation model 164 is associated with the evaluation value of the evaluation unit 167.

The update unit 169 updates the estimation model 164 based on the data set 148. Specifically, the update unit 169 performs learning using the data set 148, to update the estimation model 164 while a learning result is reflected. The data set 148 corresponds to an example of the learning data set.

The learning performed by the update unit 169 in the present embodiment uses the data set 148 in which the state variables and the evaluation values are associated with each other, so that it can be realized as so-called supervised learning.

For example, the evaluation unit 167 outputs an evaluation value "True" when an estimated result of the estimation unit 165 coincides with actual input of the user U, and outputs an evaluation value "False" when the estimated result of the estimation unit 165 does not coincide with the actual input of the user U. The state variables of the data set 148 are associated with the corresponding evaluation values "True" and "False" as labels. The update unit 169 updates the estimation model 164 to increase probability of outputting the evaluation value "True" by extracting and learning a state variable labeled with the evaluation value "True" from the data set 148, for example.

The learning performed by the update unit 169 can be also realized as so-called enhanced learning.

In this case, instead of outputting the evaluation value "True" or "False", the evaluation unit 167 outputs a compensation corresponding to the evaluation value. The compensation is set to increase when the evaluation value is "True" and to decrease when the evaluation value is "False". The update unit 169 updates the estimation model 164 to reflect the compensation every time the evaluation unit 167 determines the compensation. In this case, the environment identification unit 159 updates the estimation model 164 based on the compensation every time the estimation unit 165 performs estimation.

Every time the estimation unit 165 performs estimation and the evaluation unit 167 performs evaluation, the data set generation unit 168 accumulates data, in which a state variable and an evaluation value are combined, in the data set 148. The update unit 169 may perform learning every time a predetermined number of data sets 148 is accumulated, or may update the estimation model 164 by performing learning every time the evaluation unit 167 performs evaluation.

5. Operation of HMD

Figure 7:
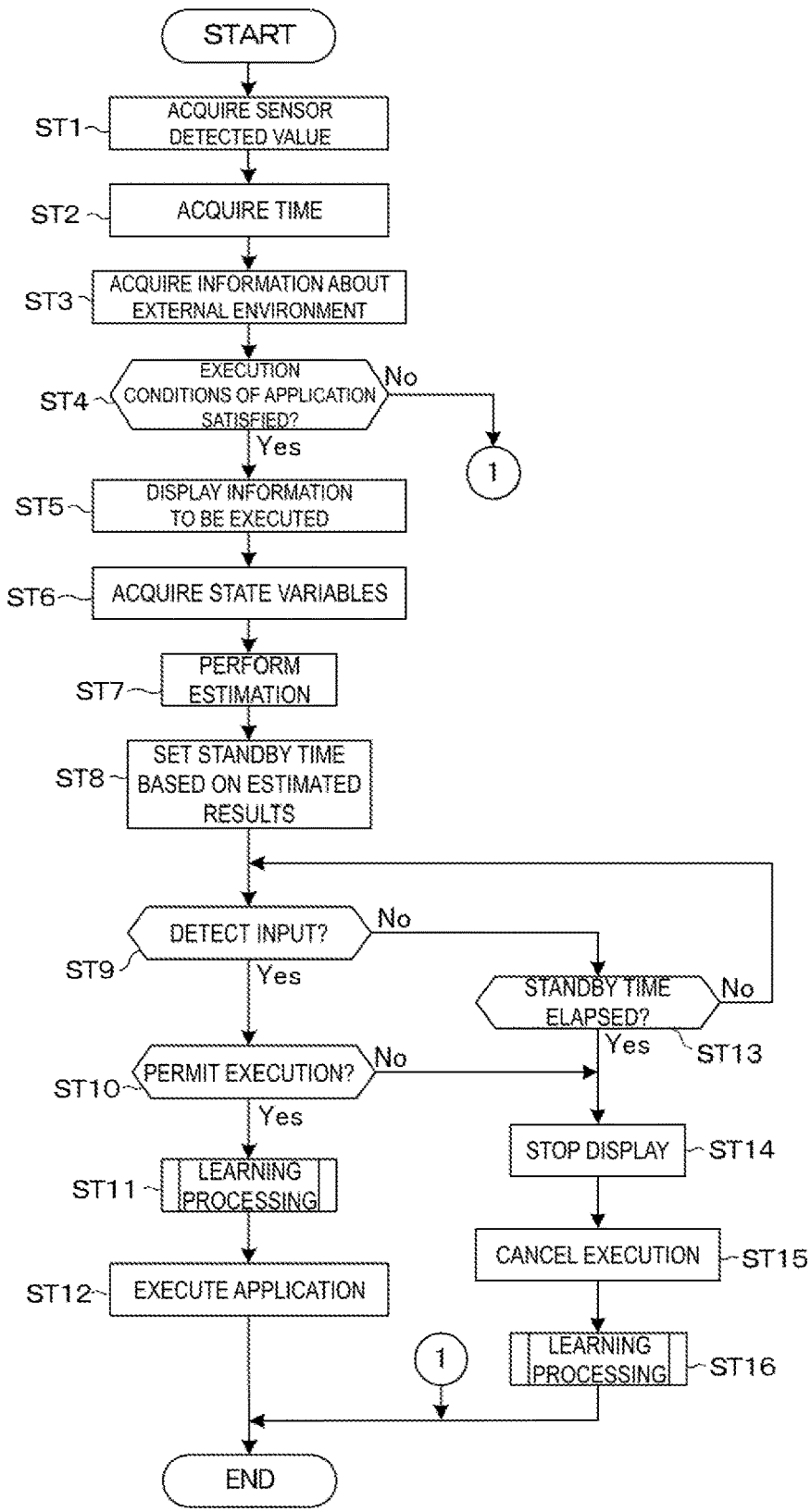
FIG. 7 is a flowchart illustrating operations of the HMD.

FIG. 7 is a flowchart illustrating operations of the HMD 100.

The application execution unit 160 acquires a detected value of each sensor acquired by the detection control unit 157, a detected value detected by the detection control unit 157, and information about input detected by the input detection unit 158 (step ST1). The application execution unit 160 acquires a time output from the clocking unit 153 (step ST2). The application execution unit 160 acquires an identified result about external environment identified by the environment identification unit 159 (step ST3).

The application execution unit 160 determines whether any one of execution conditions of the application programs 142 executable by the HMD 100 is satisfied with reference to the setting data 143 (step ST4).

When it is determined that the execution conditions of the application are not satisfied (NO at step ST4), the application execution unit 160 terminates the present process. The process of FIG. 7 is repeated in a preset cycle.

When it is determined that the execution conditions of the application is satisfied (YES at step ST4), the display control unit 152 displays the information display screen 301 including information about the application program 142 for which the conditions are satisfied (step ST5).

Subsequently, the state variable acquisition unit 163 acquires a state variable based on information acquired at steps ST1 to ST3, or the like (step ST6). At step ST6, the state variable acquisition unit 163 may additionally acquire information from the detection control unit 157, the input detection unit 158, and the environment identification unit 159 separately from the information acquired at steps ST1 to ST3.

The estimation unit 165 performs estimation based on the state variable acquired at step ST6 by the state variable acquisition unit 163, using the estimation model 164 (step ST7). In the present embodiment, the estimation unit 165 estimates whether the user U inputs permission for execution of the application program 142 or inputs rejection for the execution.

The application execution unit 160 sets a standby time based on the estimated result at step ST7 (step ST8). For example, the application execution unit 160 sets a first standby time when the estimated result at step ST7 is an input of permission for execution, and sets a second standby time when the estimated result is an input of rejection for execution. Here, the second standby time may be shorter than the first standby time.

The application execution unit 160 determines whether the input detection unit 158 detects input while the information display screen 301 is displayed by the display control unit 152 (step ST9). When it is determined that the input is detected (YES at step ST9), the application execution unit 160 determines whether input content is permission for execution of the application program 142 (step ST10).

When the input detection unit 158 detects operation of the instruction operation unit 302, the application execution unit 160 determines that the input content is the permission for execution thereof (YES at step ST10). In this case, the learning unit 162 performs a learning process (step ST11), and the application execution unit 160 executes the application program 142 (step ST12). The application execution unit 160 can perform the operations of FIG. 7 from step ST1 even during execution of the application program 142.

Meanwhile, when it is determined that the input detection unit 158 does not detect input (NO at step ST9), the application execution unit 160 acquires an elapsed time from start of displaying the information display screen 301. The application execution unit 160 determines whether the standby time set at step ST8 elapses (step ST13).

When it is determined that the standby time does not elapse (NO at step ST13), the process returns to step ST9 and the application execution unit 160 determines whether there is input (step ST9). After the determination at step ST13, a predetermined standby time may be provided until the determination is performed at step ST9.

When it is determined that the standby time elapses (YES at step ST13), the display control unit 152 stops the display of the information display screen 301 (step ST14). The application execution unit 160 cancels the execution of the application program 142 for which the execution conditions are satisfied at step ST4 (step ST15).

In this case, the learning unit 162 performs the learning process (step ST16), and the application execution unit 160 terminates the present process.

When the input detection unit 158 detects operation of the instruction operation unit 303, the application execution unit 160 determines that the input content is not an input of permission for execution (NO at step ST10). In other words, it is determined that the input content is an input of rejection for the execution. In this case, the process proceeds to step ST15 and the control unit 150 cancels the execution of the application program 142 (step ST15).

At step ST8, a standby time for input while the information display screen 301 is displayed is set based on the estimated result. Thus, when it is estimated that the user U rejects the execution of the application program 142, there is an effect of reducing display time of the information display screen 301. In this case, when the user U desires to reject the execution of the application program 142, the display of the information display screen 301 is quickly stopped, and thus visibility of the external scene VO is not impaired. In addition, when it is estimated that the user U permits the execution of the application program 142, there is an effect of increasing display time of the information display screen 301. In this case, when the user U desires to execute the application program 142, the information display screen 301 is displayed for a relatively long period of time. Thus, the user U does not need to quickly operate the instruction operation unit 302, so that a temporal margin for inputting permission for execution can be obtained. As described above, the estimated result of the estimation unit 165 is reflected in the standby time for input, so that operation reflecting an intention of the user U can be performed.

Figure 8:
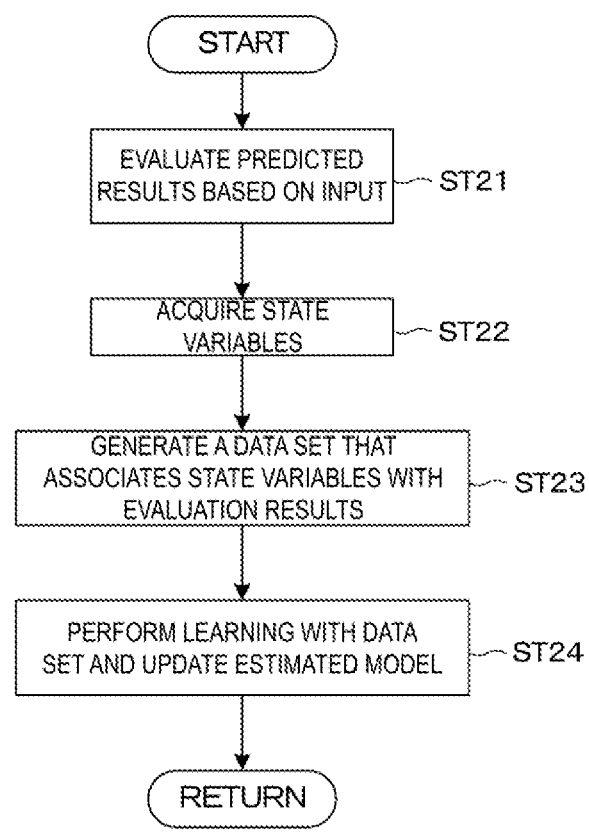
FIG. 8 is a flowchart illustrating operations of the HMD.

FIG. 8 is a flowchart illustrating operation of the HMD 100, and illustrating the learning process shown in each of steps ST11 and ST16 of FIG. 7 in detail.

The evaluation unit 167 compares the estimated result estimated by the estimation unit 165 with the determination result at step ST10 to evaluate the estimated result (step ST21).

The data set generation unit 168 acquires a state variable used in the estimation by the estimation unit 165 (step ST22). The data set generation unit 168 generates the data set 148 in which the acquired state variable is associated with the evaluation result at step ST21 (step ST23).

The update unit 169 performs machine learning using the data set 148 generated at step ST23 to update the estimation model 164 (step ST24).

In the process illustrated in FIG. 7, when the input detection unit 158 does not detect input at step ST9 and the standby time elapses at step ST12, the process proceeds to step ST16 to perform learning. In this case, the evaluation unit 167 may perform evaluation by assuming that the user U has input for rejecting execution of the application program 142. In addition, the input detection unit 158 may output a corresponding evaluation value corresponding to when the standby time elapses before the input detection unit 158 does not detect the input.

When the learning unit 162 repeats learning in operations illustrated in FIGS. 7 and 8 to result in that accuracy of coincidence between an estimated result of the estimation unit 165 and an input result exceeds a set threshold, the HMD 100 may execute the application program 142 without displaying the information display screen 301. In other words, when the estimation unit 165 estimates that the user U permits execution of the application program 142, the application execution unit 160 executes the application program 142 without displaying the information display screen 301. When the estimation unit 165 estimates that the user U rejects the execution of the application program 142, the estimation unit 165 may cancel the execution of the application program 142 without displaying the information display screen 301. In this case, using the estimation model 164 enables achieving a state where the HMD 100 is operated as desired by the user U without input of the user U.

When the learning of the learning unit 162 progresses to result in increase in reliability of an estimated result of the estimation unit 165, the control unit 150 may omit display of the information display screen 301 and input of the user U. In other words, the operation may be continued by selecting any one of the instruction operation unit 302 and the instruction operation unit 303 in the information display screen 301 in accordance with the estimated result of the estimation unit 165 even when there is no input of the user U.

The operation illustrated in FIG. 7 is an operation mode that requires input of the user U, and that is referred to below as an input mode. In contrast, an operation mode in which the control unit 150 continues operation without selecting the instruction operation unit 302 or the instruction operation unit 303 by input operation of the user U is referred to as an input omission mode.

FIG. 8 is a flowchart illustrating operation of the HMD 100, i.e., operation of switching between the input mode and the input elimination mode.

The basic control unit 151 acquires an evaluation of an estimated result of the estimation unit 165, and calculates a statistical value (step ST31). At step ST31, the basic control unit 151 acquires the result of the evaluation in step ST21 in FIG. 8 by the number of times that is most recently set, and calculates the statistical value. Examples of the statistical value include an average value, a median value, a maximum value, a minimum value, and a value that can be obtained by another statistical process.

The basic control unit 151 determines whether the statistical value of the evaluation satisfies a set criterion (step ST32). The set criterion enables determination whether the estimated result of the estimation unit 165 corresponds to an actual intention of the user U, and can be considered as a criterion for likelihood of the estimated result of the estimation unit 165.

When it is determined that the criterion is satisfied (YES at step ST32), the base control unit 151 sets the control unit 150 to perform the input omission mode as the operation mode (step ST33). When it is determined that the criterion is not satisfied (NO at step ST32), the basic control unit 151 sets the control unit 150 to perform the input mode as the operation mode (step ST34).

Figure 10:
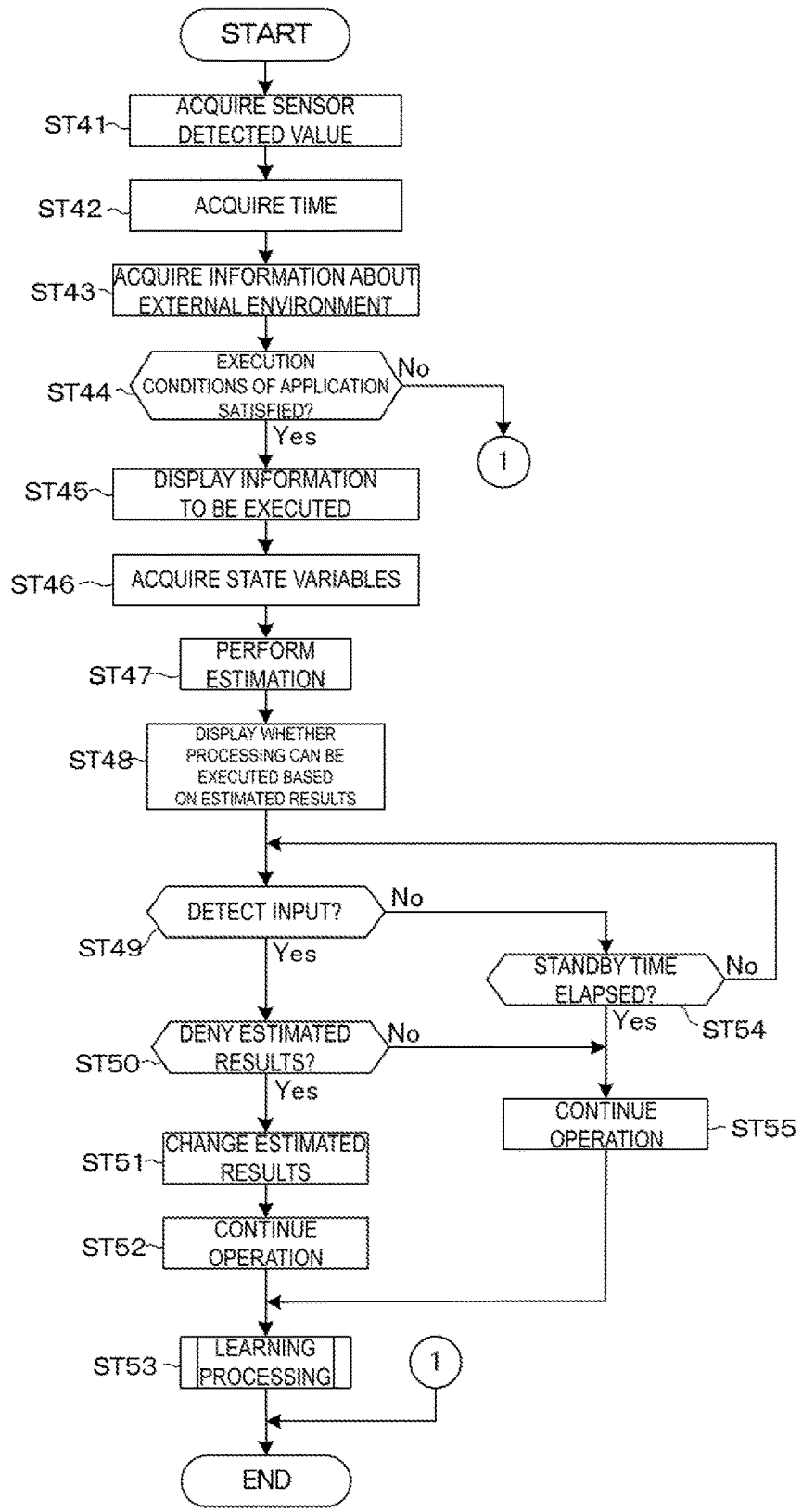
FIG. 10 is a flowchart illustrating operations of the HMD.

FIG. 10 is a flowchart illustrating operation of the HMD 100, i.e., operation of the control unit 150 in the input omission mode.

As in step ST1, the application execution unit 160 acquires a detected value of each sensor acquired by the detection control unit 157, a detected value detected by the detection control unit 157, and information about input detected by the input detection unit 158 (step ST41). As in step ST2, the application execution unit 160 acquires a time output from the clocking unit 153 (step ST42). As in step ST3, the application execution unit 160 acquires an identified result related to external environment identified by the environment identification unit 159 (step ST43).

As in step ST4, the application execution unit 160 determines whether any one of execution conditions of the application programs 142 executable by the HMD 100 is satisfied with reference to the setting data 143 (step ST44).

When it is determined that the execution conditions of the application are not satisfied (NO at step ST44), the application execution unit 160 terminates the present process. The process of FIG. 10 is repeated in a preset cycle.

When it is determined that the execution conditions of the application is satisfied (YES at step ST44), the display control unit 152 displays a screen including information about the application program 142 for which the conditions are satisfied (step ST45). The screen displayed in step ST45 is different from the information display screen 301. Specifically, the screen has no operating element for acquiring input of the user U unlike the instruction operation unit 302 and the instruction operation unit 303, and includes information about the application program 142 for which conditions are satisfied. Thus, the screen displayed in step ST45 is used for only indicating the application program 142 to be executed to the user U.

As in step ST6, the state variable acquisition unit 163 acquires a state variable based on information acquired in steps ST41 to ST43, and the like (step ST46). The state variable acquisition unit 163 may acquire information from the detection control unit 157, the input detection unit 158, and the environment identification unit 159, at step ST46.

As in step ST7, the estimation unit 165 performs estimation based on the state variable acquired at step ST6 by the state variable acquisition unit 163, using the estimation model 164 (step ST47). In the present embodiment, the estimation unit 165 estimates whether to permit or reject execution of the application program 142.

The application execution unit 160 displays whether to execute in the screen displayed at step ST45 based on the estimated result at step ST47. In the operation of FIG. 10, the control unit 150 selects execution or non-execution of the application program 142, as per the estimated result of the estimation unit 165. In step ST48, notification of execution or non-execution of the application program 142 to the user U is displayed.

The application execution unit 160 causes the input detection unit 158 to detect input by the user U while the screen is displayed by the display control unit 152 at step ST48 (step ST49). At step ST49, the input detection unit 158 detects input performed by operation on the operation unit 170, input operation identified from detected values of various sensors detected by the detection control unit 157, or the like. The input detection unit 158 may receive input by identifying a direction in which frequency of appearance of microsaccade detected by the detection control unit 157 from an image captured by the inner camera 68 increases.

When the input detection unit 158 detects input (YES at step ST49), the application execution unit 160 determines whether input content negates the estimated result at step ST47 (step ST50).

When the input negates the estimated result at step ST47 (YES at step ST50), the application execution unit 160 changes the estimated result regarding whether to execute the application program 142 (step ST51). In other words, the estimated result of the estimation unit 165 is updated to contents according to the input detected at step ST49 (step ST51).

The application execution unit 160 continues the operation in accordance with the result updated at step ST51 (step ST52). In other words, when the result is updated to execute the application program 142 at step ST51, the application program 142 is executed. In addition, when the result is updated to execute no application program 142 at step ST51, the application program 142 is not executed.

The learning unit 162 performs a learning process based on updating the estimated result at step ST51 (step ST53). The learning process performed at step ST53 is similar to the process described with reference to FIG. 8.

When step ST53 is performed via step ST51, evaluation corresponding to when a predicted result is negated is performed at step ST21. As described below, when step ST53 is performed via step ST55, evaluation corresponding to when the predicted result is not negated, i.e., when the estimated result at step ST47 is affirmed, is performed at step ST21.

Meanwhile, when the input detection unit 158 does not detect the input (NO at step ST49), the input detection unit 158 determines whether a preset standby time elapses (step ST54). When the standby time does not elapse (NO at step ST54), the process returns to step ST49. When the standby time elapses (YES at step ST54), the application execution unit 160 performs an operation as per the estimated result at step ST47 (step ST55), and the process proceeds to step ST53. For example, when at step ST47, it is estimated to execute the application program 142, the application program 142 is executed. In addition, when at step ST47, it is estimated to execute no application program 142, the application program 142 is not executed.

As described above, when the learning of the learning unit 162 is accumulated, the HMD 100 can autonomously estimate whether the application program 142 is executed according to an intention of the user U, and continue the operation, without displaying the information display screen 301 to require input of the user U.

In addition, the user U can perform input to update the estimated result after estimation whether to execute the application program 142, so that operation that is not desired by the user U can be prevented from continuing.

Further, the learning can be continued based on a result of the estimation whether to execute the application program 142, so that estimation with higher accuracy can be performed.

Figure 9:
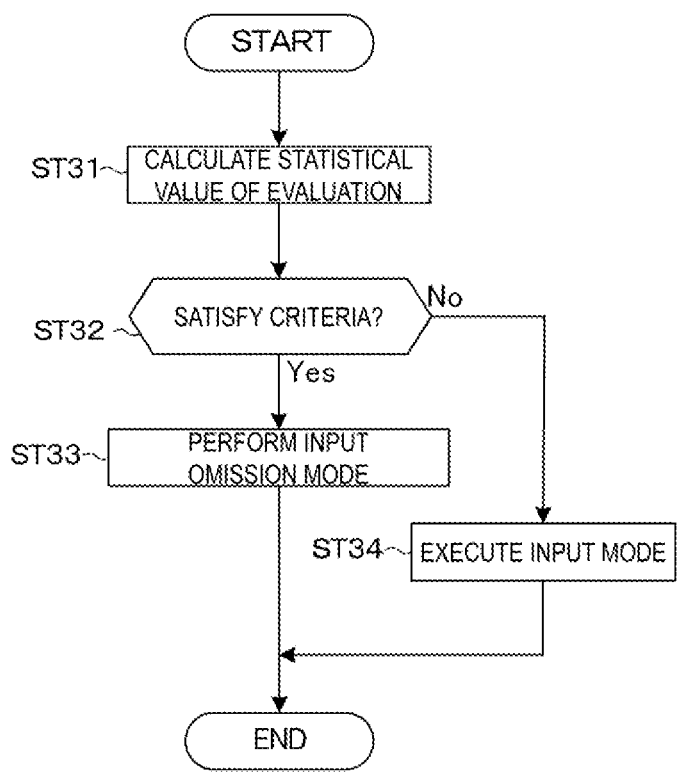
FIG. 9 is a flowchart illustrating operations of the HMD.

When the operation of FIG. 10 is performed, the operation of FIG. 9 may be performed as a result of evaluation of whether the estimated result at step ST47 is negated or affirmed. In this case, the operation mode can be switched from the input omission mode to the input mode when the estimated result of the estimation unit 165 often does not coincide with an intention of the user U due to a state of the user U and change in preference of the user U.

As described above, the HMD 100 to which the present disclosure is applied includes the image display unit 20 to be worn on the head of the user U. The HMD 100 includes the detection control unit 157 configured to detect a state of a body of a user, and the input detection unit 158 configured to receive input. The HMD 100 includes the application execution unit 160 that performs a process when conditions are satisfied. The HMD 100 also includes the display control unit 152 configured to cause the image display unit 20 to display the information display screen 301 including information about a process when the application execution unit 160 performs the process. The application execution unit 160 performs a process when the input detection unit 158 receives an execution instruction while the information display screen 301 is displayed. The HMD 100 includes the learning unit 162. The learning unit 162 includes the data set generation unit 168 that generates the data set 148 based on a detection result of the detection control unit 158 and input received by the input detection unit 158. The learning unit 162 estimates whether to perform the process using the estimation model 164, based on the detection result of the detection control unit 157, to update the estimation model 164 in accordance with the data set 148.

The operation of the image display unit 20 corresponds to an example of the display step, and the operation of the application execution unit 160 corresponds to an example of the execution step. The operation of the estimation unit 165 corresponds to an example of the estimation step, and the operation of the data set generation unit 168 corresponds to an example of the data set generation step. The operation of the update unit 169 corresponds to an example of the learning step.

According to the HMD 100 to which a display device, a learning device for the display device, and a control method of the display device are applied, an intention of the user U can be estimated. Thus, display of the information display screen 301 can be appropriately controlled. Accordingly, convenience of input operation of the user U can be improved to execute the application program 142. In addition, a learning result of the learning unit 162 can be used to develop an aspect of controlling execution of the application program 142.

The estimation model 164 is a learning model for estimating whether the user U instructs execution of the application program 142 based on a detection result of the detection control unit 157, an identified result of the environment identification unit 159, and a type of the application program 142 for which conditions are satisfied. The estimation model 164 may be called a learning model for estimating whether the user U instructs execution of the application program 142 or rejects the execution thereof. The estimation model 164 is configured to perform learning based on the data set 148, which is a learning dataset generated by the data set generation unit 168, using a learning function of the learning unit 162. The data set 148 can be configured such that at least any one of a detection result of the detection control unit 157, input detected by the input detection unit 158, and an identified result of the environment identification unit 159, is associated with a type of the application program 142 for which conditions are satisfied, for example.

The estimation model 164 may estimate a detection result of the detection control unit 157, an identified result of the environment identification unit 159, and the application program 142 that the user U desires to execute, for example. The estimation model 164 may also estimate whether to display the information display screen 301. In addition, the estimation model 164 may also estimate whether to switch between the input mode and the input omission mode.

The HMD 100 can execute or cancel the application program 142 in response to input of the user U in a configuration in which the application execution unit 160 executes the application program 142 when its conditions are satisfied. This configuration enables estimating whether the user U permits or rejects the execution of the application program 142. Thus, not only the application program 142 can be executed automatically, but also information about an intention of the user U can be obtained.

For example, it can be expected to develop an aspect of reflecting an estimated result in standby time for displaying the information display screen 301, or executing or canceling the application program 142 without waiting for input.

It can be also expected to eliminate a state in which the user U needs to quickly input, or a state of waiting for operation by the user U. Thus, further improvement in convenience can be expected without impairing convenience of the HMD 100.

The learning unit 162 estimates whether to perform a process, using the estimation model 164, based on a type of the application program 142 for which conditions are satisfied, and a detection result of the detection control unit 157. The data set generation unit 168 generates the data set 148 based on a detection result of the detection control unit 157, a type of the application program 142, and input received by the input detection unit 158. Thus, the estimation model 164 capable of estimation with high accuracy can be obtained by performing learning based on multi-variables including a state variable containing a detection result of the detection control unit 157 and a type of the application program 142.

The detection control unit 157 performs detection using a sensor provided in the image display unit 20. The sensor is at least one of the inner camera 68 serving as an eye sensor for detecting a state of a pupil of a user or a line-of-sight of the user, the heart rate sensor 73 for detecting heartbeat of the user, and the perspiration sensor 72 for detecting perspiration of the user. The sensor used by the detection control unit 157 may be the myoelectric sensor 74, or the six-axis sensor 111 or 235. Thus, a state of the body of the user U can be learned as a state variable, so that the estimation model 164 capable of estimating an intention of the user U with higher accuracy can be obtained.

The HMD 100 includes the outer camera 61 provided in the image display unit 20, and the environment identification unit 159 that identifies environment based on a captured image. The learning unit 162 estimates whether to perform a process, using the estimation model 164, based on an identified result of the environment identification unit 159 and a detection result of the detection control unit 157. The data set generation unit 168 generates the data set 148 based on a detection result of the detection control unit 157, an identified result of the environment identification unit 159, and input received by the input detection unit 158. Thus, learning reflecting environment outside the HMD 100 can be performed, so that the estimation model 164 capable of estimating an intention of the user U with higher accuracy can be obtained.

The display control unit 152 stops display when a predetermined display time, i.e., a standby time elapses after the image display unit 20 displays information. The standby time is determined in accordance with a result estimated by the learning unit 162 using the estimation model 164. For example, when it is estimated that the user U rejects execution of the application program 142, a display time of the information display screen 301 can be shortened. Accordingly, when the user U desires to reject the execution of the application program 142, the display of the information display screen 301 is quickly stopped, and thus visibility of the external scene VO is not impaired. In addition, when it is estimated that the user U permits the execution of the application program 142, a display time of the information display screen 301 can be increased. In this way, when the user U desires to execute the application program 142, the information display screen 301 is displayed for a relatively long period of time. Thus, the user U does not need to quickly operate the instruction operation unit 302, so that a temporal margin for inputting permission for execution can be obtained. As described above, the estimated result of the estimation unit 165 is reflected in the standby time for input, so that operation reflecting an intention of the user U can be performed.

As described with reference to FIG. 10, the control unit 150 may determine whether to execute the application program 142 based on an estimated result of the estimation unit 165 while information about a type of the application program 142 to be executed is displayed on a screen different from the information display screen 301. In this case, the application program 142 can be executed according to an intention of the user U using the learned estimation model 164 without requiring input by the user U.

6. Other Embodiments

The embodiment described above is only an aspect in which the present disclosure is applied, and can be changed to various aspects.

For example, instead of the image display unit 20, another type of image display unit such as an image display unit to be worn like a cap may be employed. Such an image display unit may include a display unit configured to display an image corresponding to the left eye LE of the user U and a display unit configured to display an image corresponding to the right eye RE of the user U. The display device according to the present disclosure may be also configured as a head mount display mounted on a vehicle such as a car, or an airplane, for example. In addition, the display device may be configured as a head mount display built in a body protector tool such as a helmet, for example. In this case, the head mount display may include mounting portions including a first portion for positioning the head mount display with respect to the body of the user U, and a second portion positioned with respect to the first portion.

Further, the controller 10 and the image display unit 20 may be integrally formed to be worn on the head of the user U. As the controller 10, portable electronic devices such as a notebook-type computer, a tablet-type computer, a game console, a portable phone device, a smartphone, and a portable media player, as well as other dedicated devices and the like, may be employed. The sensor unit 70 may be formed integrally with the image display unit 20.

While in the embodiment described above, the configuration where the image display unit 20 and the controller 10 are separated and connected via the connecting cable 40 is described, the controller 10 and the image display unit 20 may be connected using a wireless communication line.

As an optical system configured to guide imaging light to eyes of the user U, a half mirror, a diffraction grating, a prism, or the like may be used for each of the right light-guiding plate 26 and the left light-guiding plate 28. The image display unit 20 also may employ a holography display unit.

While in the embodiment described above, the image display unit 20 is described as a configuration of generating imaging light using the OLED units 221 and 241, the present disclosure is not limited thereto. As an example, there is illustrated a configuration where the OLED units 221 and 241 each include an OLED panel and an OLED drive circuit configured to drive the OLED panel. Here, the OLED panel is a self-luminous type display panel including light-emitting elements each configured to emit light using organic electroluminescence. As a more specific example, there is a configuration where the OLED panel includes a plurality of pixels, each including an R element, a G element, and a B element, arranged in a matrix. As a modification, each of the right display unit 22 and the left display unit 24 may be configured as a video element including an OLED panel as a light source unit and a modulation element configured to modulate light output from the light source unit to output imaging light containing a plurality of color light beams. In this way, each of the right display unit 22 and the left display unit 24 can be configured such that imaging light modulated by the modulation element is guided to an eye of the user U using the projection optical system, the light guide plate, and the like to cause the user U to recognize a virtual image. In an image display unit of the modification, as a modulation device configured to modulate light output from the OLED panel, a transmissive liquid crystal panel, a reflective liquid crystal panel instead of the transmissive liquid crystal panel, or a digital micromirror device, may be employed. The light source may be a laser light source, or an LED. The image display unit 20 may be a laser retinal projection-type HMD of a laser scanning type, for example.

Additionally, at least a part of each function block illustrated in the block diagram may be achieved with hardware, or may be a configuration achieved by hardware and software working together, and the present disclosure is not limited to the configuration in which independent hardware resources are disposed as illustrated in the drawing. The control unit 150 executes programs that may be stored in a non-volatile storage unit 121 or in another storage device in the controller 10. In addition, a program stored in an external device may be acquired and executed via the USB connector 19, the communication unit 117, and the external memory interface 191, and the like. The configuration formed in the controller 10 may be duplicated in the image display unit 20. For example, a processor similar to the main processor 125 may be disposed in the image display unit 20, or the main processor 125 included in the controller 10 and the processor of the image display unit 20 may be each configured to perform a separate function.

What is claimed is:

1. A display device comprising:
a display mounted on a head of a user;
a sensor configured to detect a state of a body of the user;
a controller configured to receive an input;
a processor configured to execute processing when a condition is satisfied; and
a digital signal processor configured to display information about the processing on the display when the processor executes the processing and stop the display after a predetermined display time, wherein
the processor executes the processing when an execution instruction is received by the controller while the information about the processing is displayed,
the processor generates a learning data set based on a detection result by the sensor and an input received by the controller,
the processor estimates, by an estimation model, based on the detection result by the sensor, whether the processing is executable to update the estimation model according to the learning data set, and
the processor executes the processing according to an estimated result obtained using the estimation model, wherein the display time is determined according to the estimated result.

2. The display device according to claim 1, wherein
the processor is configured to estimate by the estimation model whether the processing is executable, based on a type of the processing and the detection result by the sensor, and
the processor is configured to generate the learning data set based on the detection result by the sensor, the type of the processing, and the input received by the controller.

3. The display device according to claim 1, wherein
the sensor is provided at the display, and
the sensor is at least one of an eye sensor configured to detect a state of a pupil or a line-of-sight of the user, a heart rate sensor configured to detect a heart rate of the user, and a perspiration sensor configured to detect perspiration of the user.

4. The display device according to claim 1, wherein
the sensor is provided at the display, and
the sensor is at least one of a motion sensor configured to detect a motion of the display and a sensor configured to detect a motion of a muscle of the user.

5. The display device according to claim 1, comprising:
a camera provided at the display, wherein
the processor is configured to identify an environment based on a captured image by the camera,
the processor is configured to estimate, by the estimation model, whether the processing is executable based on an identification result and the detection result by the sensor, and
the processor is configured to generate the learning data set based on the detection result by the sensor, the identification result, and the input received by the controller.

6. A display device comprising:
a display mounted on a head of a user;
a sensor configured to detect a state of a body of the user;
a processor configured to execute processing when a condition is satisfied; and
a digital signal processor configured to display information about the processing on the display when the processor executes the processing and stop the display after a predetermined display time, wherein
the processor executes the processing based on a detection result by the sensor while information about the processing is displayed,
the processor updates an estimation model of whether the processing is executable, based on a combination of the detection result by the sensor, and the processor executes the processing according to an estimate result obtained using the estimation model, wherein the display time is determined according to the estimated result.

7. A learning device configured to perform processing for a display device including a display mounted on a head of a user and a sensor configured to detect a state of a body of the user, the learning device comprising:
- a controller configured to receive an input;
- a processor configured to execute processing when a condition is satisfied; and
- a digital signal processor configured to display information about the processing on the display when the processor executes the processing and stop the display after a predetermined display time,
- the processor executes the processing when an execution instruction is received by the controller while the information about the processing is displayed,
- the processor generates a learning data set based on a detection result by the sensor and an input received by the controller,
- the processor estimates, by an estimation model, based on the detection result by the sensor, whether the processing is executable, to update the estimation model according to the learning data set, and
- the processor executes the processing according to an estimated result obtained using the estimation model, wherein the display time is determined according to the estimated result.

8. A control method of a display device including a display mounted on a head of a user, the control method comprising:
- displaying, on the display, information about processing to be executed when a condition is satisfied;
- executing the processing when an input of an execution instruction is received while the information is displayed and stopping the display after a predetermined display time;
- estimating, by an estimation model, based on a detection result obtained by detecting a state of the user, whether the processing is executable;
- generating a learning data set based on the detection result and the input;
- updating the estimation model according to the learning data set; and
- executing the processing according to an estimated result obtained using the estimation model, wherein the display time is determined according to the estimated result.

* * * * *